US012640143B2

(12) United States Patent
Weisz et al.

(10) Patent No.: US 12,640,143 B2
(45) Date of Patent: May 26, 2026

(54) UTILIZING GENERATIVE MODEL IN GENERATING SUMMARY OF LONG-FORM CONTENT

(71) Applicant: GOOGLE LLC, Mountain View, CA (US)

(72) Inventors: Ágoston Weisz, Zurich (CH); Michael Andrew Goodman, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 118 days.

(21) Appl. No.: 18/390,830

(22) Filed: Dec. 20, 2023

(65) Prior Publication Data

US 2025/0210037 A1    Jun. 26, 2025

(51) Int. Cl.
| | |
|---|---|
| *G10L 15/183* | (2013.01) |
| *G10L 13/033* | (2013.01) |
| *G10L 15/02* | (2006.01) |
| *G10L 15/04* | (2013.01) |

(52) U.S. Cl.
CPC .......... *G10L 15/183* (2013.01); *G10L 13/033* (2013.01); *G10L 15/02* (2013.01); *G10L 15/04* (2013.01)

(58) Field of Classification Search
CPC ..... G10L 15/183; G10L 13/033; G10L 15/02; G10L 15/04; G06F 16/685; G06F 16/345
See application file for complete search history.

(56) References Cited

U.S. PATENT DOCUMENTS

| | | | | |
|---|---|---|---|---|
| 11,769,017 | B1 * | 9/2023 | Gray ...................... | G06F 40/56 |
| | | | | 704/9 |
| 11,860,914 | B1 * | 1/2024 | Qadrud-Din ........... | G06F 40/56 |
| 11,861,320 | B1 * | 1/2024 | Gajek ..................... | G06F 40/40 |
| 12,045,568 | B1 * | 7/2024 | Shrivastava ........ | G10L 15/1815 |
| 12,067,366 | B1 * | 8/2024 | Heller ..................... | G06F 40/35 |
| 12,159,096 | B1 * | 12/2024 | Penfield ................. | G06F 40/30 |
| 12,374,321 | B2 * | 7/2025 | Asi ........................ | G10L 15/063 |

(Continued)

OTHER PUBLICATIONS

Kelsey Foster, "Automatically summarize audio and video files at scale with AI" AssemblyAI. Retrieved from https://www.assemblyai.com/blog/automatically-summarize-audio-and-video-files-at-scale-with-ai/. 20 pages, dated Nov. 3, 2023.

(Continued)

*Primary Examiner* — Fariba Sirjani
(74) *Attorney, Agent, or Firm* — Gray Ice Higdon

(57) ABSTRACT

Implementations utilize a LLM to generate one or more summaries for long-form content such as an audiobook. Implementations determine whether the long-form content has a token length that exceeds a maximum token length for the LLM. In response to determining that the token length exceeds the maximum token length, the long-form content (or a transcript thereof) is segmented into at least a first content portion and a second content portion. A first summary is generated for the first content portion based on processing the first content portion as input using the LLM. A second summary is generated for the second content portion based on processing the first summary and the second content portion using the LLM. An overall summary can be generated to include the first and second summaries. The overall summary can be rendered visually and/or audibly in response to a user request for a summary of the long-form content.

19 Claims, 9 Drawing Sheets

(56) References Cited

U.S. PATENT DOCUMENTS

| | | | | |
|---|---|---|---|---|
| 2019/0042551 A1* | 2/2019 | Hwang | | G06V 30/40 |
| 2020/0105274 A1* | 4/2020 | Joller | | G10L 25/63 |
| 2021/0056170 A1* | 2/2021 | Bohannon | | G06F 16/3329 |
| 2021/0124876 A1* | 4/2021 | Kryscinski | | G06F 16/345 |
| 2021/0217404 A1* | 7/2021 | Jia | | G10L 13/033 |
| 2021/0365633 A1* | 11/2021 | Wagner | | G06N 20/00 |
| 2022/0028390 A1* | 1/2022 | Poznanski | | G10L 15/19 |
| 2022/0353470 A1* | 11/2022 | Huang | | G06F 40/289 |
| 2022/0392434 A1* | 12/2022 | Asi | | G06N 20/00 |
| 2023/0092702 A1* | 3/2023 | Mao | | G10L 15/20 |
| | | | | 704/9 |
| 2023/0205985 A1* | 6/2023 | Zhu | | G06F 40/56 |
| | | | | 704/235 |
| 2023/0281248 A1* | 9/2023 | Schalkwyk | | G06F 16/739 |
| | | | | 707/749 |
| 2024/0205520 A1* | 6/2024 | Carbajo | | G10L 15/26 |
| 2024/0273309 A1* | 8/2024 | Heller | | G06F 40/205 |
| 2024/0274122 A1* | 8/2024 | Wang | | G10L 15/16 |
| 2024/0296826 A1* | 9/2024 | Sharma | | G10L 13/02 |
| 2024/0303422 A1* | 9/2024 | Fabian | | G06F 16/3329 |
| 2024/0346249 A1* | 10/2024 | Ben-David | | G06F 40/289 |
| 2025/0005050 A1* | 1/2025 | Krishnan | | G06F 16/243 |
| 2025/0005288 A1* | 1/2025 | Amatriain-Rubio | | |
| | | | | G06F 40/216 |
| 2025/0005523 A1* | 1/2025 | Katta | | G06F 40/186 |
| 2025/0053748 A1* | 2/2025 | Fayyaz | | G06F 40/35 |
| 2025/0077590 A1* | 3/2025 | Tobin | | G06F 16/951 |
| 2025/0110618 A1* | 4/2025 | Kumar | | G06F 3/0484 |
| 2025/0139387 A1* | 5/2025 | Jang | | G06F 40/284 |
| 2025/0200100 A1* | 6/2025 | Hintz | | G06F 40/40 |
| 2025/0210037 A1* | 6/2025 | Weisz | | G10L 15/183 |
| 2025/0252261 A1* | 8/2025 | Roy | | G06F 16/35 |

OTHER PUBLICATIONS

Jeremy Gutsche, "Better and Faster" Retrieved from https://quickread. com/book-summary/better-and-faster-254. 4 pages, dated 2023.
European Patent Office; International Search Report and Written Opinion issued in Application No. PCT/US2024/061003; 13 pages; dated Mar. 5, 2025.

* cited by examiner

300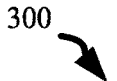

OBTAIN A TRANSCRIPT 301

SEGMENT THE TRANSCRIPT INTO A PLURALITY OF TRANSCRIPT PORTIONS ($T_1$~$T_N$) 303

SEGMENT THE TRANSCRIPT BASED ON CONSTRAINT(S) OF LLM 3031

FOR EACH OF THE PLURALITY OF TRANSCRIPT PORTIONS, GENERATE A CORRESPONDING SUMMARY FOR THE TRANSCRIPT PORTION BASED AT LEAST ON PROCESSING THE TRANSCRIPT PORTION USING A LARGE LANGUAGE MODEL (LLM) 305

GENERATE A FIRST SUMMARY OF A FIRST TRANSCRIPT PORTION ($T_1$) BASED ON PROCESSING THE FIRST TRANSCRIPT PORTION USING THE LLM 3051

FOR $i^{th}$ TRANSCRIPT PORTION ($T_i$, $i>1$), GENERATE AN $i^{th}$ SUMMARY OF THE $N^{th}$ TRANSCRIPT PORTION BASED ON PROCESSING THE $(i-1)^{th}$ SUMMARY AND THE $i^{th}$ TRANSCRIPT PORTION AS INPUT, USING THE LLM 305i $i<N$ $i=N$

GENERATE AN OVERALL SUMMARY FOR THE TRANSCRIPT BASED ON THE GENERATED CORRESPONDING SUMMARIES 307

IN RESPONSE TO A REQUEST FOR A CONDENSED VERSION OF THE TRANSCRIPT OR AUDIO DATA FROM WHICH THE TRANSCRIPT IS DETERMINED: CAUSE RENDERING OF THE OVERALL SUMMARY 309

*FIG. 3*

400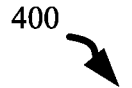

OBTAIN A TRANSCRIPT OF AN AUDIO-BASED FILE, THE TRANSCRIPT BEING ASSOCIATED WITH ONE OR MORE SPEAKER TAGS <u>401</u>

SEGMENT THE TRANSCRIPT INTO A PLURALITY OF TRANSCRIPT PORTIONS INCLUDING AT LEAST A FIRST TRANSCRIPT PORTION AND A SECOND TRANSCRIPT PORTION <u>403</u>

FOR EACH OF THE PLURALITY OF TRANSCRIPT PORTIONS, GENERATE A CORRESPONDING SUMMARY FOR THE TRANSCRIPT PORTION THAT IS BASED ON PROCESSING THE TRANSCRIPT PORTION USING A LARGE LANGUAGE MODEL, THE CORRESPONDING SUMMARY BEING ASSOCIATED WITH AT LEAST ONE SPEAKER TAG FROM THE ONE OR MORE SPEAKER TAGS <u>405</u>

GENERATE AN OVERALL SUMMARY FOR THE AUDIO-BASED FILE BASED ON THE GENERATED CORRESPONDING SUMMARIES <u>407</u>

IN RESPONSE TO A REQUEST FOR A CONDENSED VERSION OF THE AUDIO-BASED FILE: CAUSE AUDIBE RENDERING OF THE OVERALL SUMMARY FOR THE AUDIO-BASED FILE BASED ON THE ONE OR MORE SPEAKER TAGS <u>409</u>

*FIG. 4*

UTILIZING GENERATIVE MODEL IN GENERATING SUMMARY OF LONG-FORM CONTENT

BACKGROUND

Recent years have shown a remarkable growth in media consumption in digital formats. For example, human users (e.g., drivers) experiencing long driving hours now have increased access to audiobooks (or other audio content) accessible via in-vehicle entertainment systems. As another example, human users (e.g., students, those with impaired vision, etc.) are now consuming literature or other content (e.g., courses) from audiobooks or podcasts accessible via different types of electronic devices, such as a smart phone equipped with an automated assistant. As a further example, human users are also accessing videos, audiobooks, podcasts, or other content via content-sharing platforms such as social media platforms and music apps, to acquire knowledge and improve skills, on a daily basis.

Many audiobooks and/or other audio-based content can be of a long duration such as thirty minutes, one hour, or multiple hours. For users having limited time and/or utilizing a client device for listening that has limited power resources (e.g., a battery powered smart phone), it may not be feasible to consume a long duration version of audio content such as an audiobook, a meeting recording, a podcast, or other audio content. Such a user can attempt to search (e.g., via the Internet or a content-sharing platform) for media content that summarizes the audiobook (or other audio-based content). However, such searching itself can be time consuming and/or utilize extensive computational resources. Moreover, media content summarizing the audio content may not be available via such searching.

Several techniques have been proposed in utilizing generative models to generate summaries for short-form content. However, constraints of such generative models prevent summarization of various long-form content utilizing such techniques. For example, utilization of generative model(s) can be constrained by maximum token lengths that dictate the maximum quantity of tokens that can be processed using the generative model(s). The maximum token length constraint can be a function of constraints of the generative model itself and/or constraints of hardware component(s) that performs processing based on the model (e.g., constraints of memory and/or GPU(s)). Accordingly, such techniques can fail when the quantity of tokens to be summarized exceeds the maximum token length of a generative model to be utilized in the summarization. Moreover, such techniques can additionally or alternatively fail to generate summaries that include, in the generated summary, an indication of what voice, from the original content, corresponds to which portion(s) in the summary.

SUMMARY

Implementations disclosed herein relate to utilizing a generative model (e.g., a trained large language model, "LLM") in generating a summary for long-form content, such as an audiobook that contains a recording of long speech audio, or a thesis with hundred(s) of pages. For short-form content such as short speech audio (recorded or streaming, e.g., for a meeting, video, etc.), a transcript of the short speech audio can be acquired based on performing a speech recognition of the short speech audio, and a summary for the short speech audio can be generated based on processing the transcript of the short speech audio (and/or a single instruction to generate a summary for the transcript of the short speech audio) as input, using the generative model. However, this approach may not be applicable to long-form content when a token length of the long-form content (or a transcript thereof) exceeds a maximum token length associated with the generative model. For instance, the long-form content can be speech audio that lasts hours, tens of hours, or hundreds of hours, and a transcript of such speech audio may have a token length that exceeds the maximum token length of content processable as input using the generative model.

Various implementations of this disclosure relate to generating a summary (e.g., an overall summary) for long-form content, such as long-form content with a token length that exceeds a maximum token length of a generative model. The long-form content can be, but is not limited to be, audio-based content such as an audiobook, streaming speech audio, a podcast, a video, or other audio-based file/data. In various implementations, a transcript of the audio-based content can be acquired based on performing a speech recognition of audio data for the audio-based content, and the transcript of the audio-based content is segmented/divided into a plurality of transcript portions including at least a first transcript portion and a second transcript portion. Optionally, the transcript of the audio-based content can be segmented based on a maximum token length for a generative model to be utilized in generating the summary. The maximum token length can be dependent on constraints of the generative model itself and/or dependent on constraints (e.g., memory constraints) of the computing device(s) that are utilized in processing data utilizing the generative model. In some implementations, the first transcript portion and the second transcript portion can each have a token length that is approximately 80% or 90% (or other predefined percentage) of the maximum token length. In some other implementations, the first transcript portion and the second transcript portion (divided from the transcript of the audio-based content) can have different token lengths. For instance, the first transcript portion can have a first token length that is approximately 90% of the maximum token length, and the second transcript portion can have a second token length that is approximately 80% of the maximum token length.

In some implementations, a first summary corresponding to the first transcript portion can be generated based on processing the first transcript portion using the generative model, and a second summary corresponding to the second transcript portion can be generated based on processing the second transcript portion using the generative model. An overall summary for the audio-based content can be generated based on the first summary and the second summary (and additional summaries if the transcript of the audio-based content includes additional transcript portions that are in addition to the first and second transcript portions).

In some implementations, to generate the first summary for the first transcript portion, a first textual prompt (sometimes referred to as "first prompt") can be generated, where the first textual prompt includes the first transcript portion and a first instruction to generate a summary for the first transcript portion. The first textual prompt can be processed as input, using the generative model, to generate a first model output from which the first summary for the first transcript portion is determined/derived. In some implementations, to generate the second summary for the second transcript portion, a second textual prompt ("second prompt") can be generated, where the second textual prompt includes the first summary, the second transcript portion, as well as a second instruction to generate a summary for the second transcript portion (e.g., in view of the first summary). The second textual prompt can be processed as input, using the generative model, to generate a second model output from which the second summary for the second transcript portion is determined/derived. Generating the second summary based on the second textual prompt that includes not only the second transcript portion but also the first summary, ensures that the second summary takes into consideration content of the first summary and that the transition from the first summary and the second summary (e.g., in the overall summary) can be natural/smooth (e.g., in the situation where the overall summary is generated by directly combining the first summary and the second summary).

In some implementations, as described above, the first transcript portion can have the first token length that corresponds to a first percentage (e.g., approximately 90%) of the maximum token length. The second transcript portion can have a second token length that corresponds to a second percentage (e.g., approximately 80%) of the maximum token length. The second percentage can be less than (or equal to) the first percentage, so that the second textual prompt (including the first summary, the second transcript portion, and the second instruction), which is longer than (or equal to) the first textual prompt, can be processed at the computing device, to avoid or reduce the risk of the second textual prompt being too long to be processed.

In some implementations, the generative model can be fine-tuned, e.g., in a supervised manner, so that the first instruction can be omitted from the first textual prompt (that is to be processed using the generative model) and the second instruction can be omitted from the second textual prompt (that is to be processed using the generative model). For instance, the generative model can be fine-tuned using one or more training instances, where each of the one or more training instances includes a text as training instance input and include a summary for the text as a ground truth output, where the text (i.e., the ground truth output) is to be compared with a training instance output generated by processing the training instance input using the generative model). By fine-tuning the generative model using the one or more training instances that each include a text as training instance input and a summary for the text as a ground truth output, the first transcript portion can be processed as input using the fine-tuned generative model, to generate the first summary. The first summary and the second transcript portion can be processed as input using the fine-tuned generative model, to generate the aforementioned second summary.

Put another way, the first instruction to generate a summary for the first transcript portion can be omitted from the first textual prompt, and only the first transcript portion is processed (e.g., as input, using the fine-tuned generative model) to generate the first summary. The second instruction to generate a summary for the second transcript portion can be omitted from the first textual prompt, and only the first summary and the second transcript portion are processed (e.g., as input, using the fine-tuned generative model) to generate the second summary.

In some implementations, as described above, the transcript for the audio-based content can be segmented into more than two transcript portions. For instance, the transcript for the audio-based content can be divided into a first transcript portion, a second transcript portion, . . . , and an $n^{th}$ transcript portion, where n>2. In these implementations, to generate an $n^{th}$ summary for the $n^{th}$ transcript portion, an $n^{th}$ textual prompt can be generated, where the $n^{th}$ textual prompt includes a (n-1)th summary for a (n-1)th transcript portion, the $n^{th}$ transcript portion, and/or an $n^{th}$ instruction to generate a summary for the $n^{th}$ transcript portion (e.g., in view of the (n-1)th summary). The $n^{th}$ textual prompt can be processed as input, using the generative model, to generate an $n^{th}$ model output from which the $n^{th}$ summary for the $n^{th}$ transcript portion is determined/derived. For instance, when the transcript for the audio-based content is segmented into a first transcript portion, a second transcript portion, and a third transcript portion, a third textual prompt can be generated, where the third textual prompt includes a second summary for the second transcript portion, the third transcript portion, and/or a third instruction to generate a summary for the third transcript portion in view of the second summary. The third textual prompt can be processed as input, using the generative model (or the fine-tuned generative model as described above), to generate a third summary for the third transcript portion. It is noted that the third textual prompt can exclude the first transcript portion, exclude the first summary for the first transcript portion, and exclude the second transcript portion in view of e.g., maximum token length constraints and/or other constraints. However, the third textual prompt can include the generated second summary, which can have been generated based on the second transcript portion and the generated first summary. Accordingly, inclusion of the generated second summary in the third textual prompt can enable the third summary to be generated with context of earlier transcript portions, while taking into account technical constraint(s) of the generative model.

Optionally, the first summary for the first transcript portion, the second summary for the second transcript portion, . . . , and the $n^{th}$ summary for the $n^{th}$ transcript portion can be combined to generate an overall summary for the audio-based content. For example, the first summary, the second summary, . . . , and the $n^{th}$ summary can be directly combined to generate the overall summary. As another example, the first summary, the second summary, . . . , and the $n^{th}$ summary can be processed (e.g., adding subtitles, removes redundancy, etc.) to generate the overall summary.

In some implementations, the overall summary can be stored in association with the audio-based content for which the overall summary is derived/generated. Alternatively or additionally, the first summary can be stored in association with the first transcript portion of the audio-based content, the second summary can be stored in association with the second transcript portion of the audio-based content, . . . , and the $n^{th}$ summary can be stored in association with the $n^{th}$ transcript portion of the audio-based content. In some implementations, alternatively or additionally, audio data for the overall summary can be generated and stored in association with the audio-based content. Alternatively or additionally, audio data for the first summary can be generated and stored in association with the first transcript portion of the audio-based content, audio data for the second summary can be generated and stored in association with the second transcript portion of the audio-based content, . . . , and audio data for the $n^{th}$ summary can be generated and stored in association with the $n^{th}$ transcript portion of the audio-based content. This way, not only a user can access (e.g., view and/or listen to) an overall summary for the audio-based content, but also the user can select a summary for a desired portion of the audio-based content to be rendered (audibly and/or visually).

By generating summaries (e.g., a 20-min shortened version) of long-form content (e.g. textual, audio, and/or audio-visual content of a long length, e.g., a two-hour long podcast), a user with limited time or a user uses a client device that has limited remaining battery life (e.g., less than one hour) can still learn key takeaways from the long-form content, without spending extensive time reviewing or listening to the long-form content. For example, creating a summary for an audio recording of a meeting that lasts hours long and sending (e.g., via email) the summary to meeting participants of the meeting can result in lessened network traffic and, further, lessened resource utilization from client devices of the meeting participants in listening to the summary (instead of the audio recording itself).

In some implementations, optionally, a transcript associated with the long-form content (e.g., the aforementioned audio-based content that exceeds the maximum token length, such as long speech audio, a long video, etc.) can be assigned one or more speaker tags. Assume the transcript associated with the long-form content is segmented into a first transcript portion and a second transcript portion, for the first and second transcript portions to be processable using the generative model respectively. As an example, the first transcript portion (segmented from the transcript) may be labeled or be assigned a first speaker tag of the one or more speaker tags, and the second transcript portion (segmented from the transcript) may be labeled or be assigned a second speaker tag. In this case, the first summary generated based on the first transcript portion can be associated with the first speaker tag, so that audio data generated for the first summary can correspond to a first voice of a first speaker that the first speaker tag corresponds to (e.g., the audio data of the first summary can be rendered in the first voice). The second summary generated based on the first summary and the second transcript portion can be associated with the second speaker tag, so that audio data generated for the second summary can correspond to a second voice of a second speaker that the second speaker tag corresponds to (e.g., the audio data of the second summary can be rendered in the second voice).

As another example, the first transcript portion (segmented from the transcript) may be labeled or assigned a first speaker tag and a second speaker tag (different from the first speaker tag), of the one or more speaker tags. In this example, optionally, the second transcript portion (segmented from the transcript) may be labeled or assigned a third speaker tag different from the first and second speaker tags. In this example, the first summary generated based on the first transcript portion may include a first portion associated with the first speaker tag and a second portion associated with the second speaker tag. The second summary generated based on the first summary and the second transcript portion can be associated with the third speaker tag. In this case, audio data for the first summary can be generated to include first audio data for the first portion of the first summary (to be rendered in the first voice of the first speaker that corresponds to the first speaker tag) and second audio data for the second portion of the second summary (to be rendered in the second voice of the second speaker that corresponds to the second speaker tag). Additional audio data for the second summary can be generated and rendered in the third voice of the third speaker that corresponds to the third speaker tag.

In various implementations, a method implemented using one or more processors is provided, where the method includes: obtaining a transcript of an audio-based file; and segmenting the transcript into a plurality of transcript portions including at least a first transcript portion and a second transcript portion. In some implementations, segmenting the transcript into the plurality of transcript portions is in response to determining that a length (e.g., token length) of the transcript exceeds a processing threshold (e.g., maximum token length, etc.) of the large language model. In some implementations, alternatively or additionally, segmenting the audio-based file into the plurality of portions is based on a timestamp for each of the plurality of portions. In some implementations, alternatively or additionally, segmenting the audio-based file into the plurality of portions is based on user input that defines the plurality of portions.

In some implementations, the transcript of the audio-based file can be acquired by performing speech recognition on audio data associated with the audio-based file. In some implementations, the audio-based file can be a video file, and the transcript of the audio-based file can be acquired from metadata associated with the video file. In some implementations, the audio-based file is an audio book including a plurality of chapters. In some of those implementations, segmenting the transcript into the plurality of transcript portions includes: identifying chapters of the audio-based file, and segmenting the transcript into the plurality of transcript portions based on the identified chapters, where each of the plurality of transcript portions corresponds to a respective chapter of the audio-based file.

In some implementations, the transcript for a respective portion from the plurality of portions includes one or more speaker tags each for a corresponding speaker in the respective portion. In these implementations, the summary for the respective portion includes at least one speaker tag, and audio data for the summary for the respective portion is generated based on the at least one speaker tag.

In various implementations, the method further includes: for each of the plurality of transcript portions, generating a corresponding summary for the transcript portion that is based on processing the transcript portion using a large language model ("LLM"). In some implementations, generating the corresponding summaries of the transcript portions includes: generating a first summary, of the corresponding summaries, that summarizes the first transcript portion; and generating a second summary, of the corresponding summaries, that summarizes the second transcript portion. In some implementations, generating the first summary includes: generating a first text prompt that includes the first transcript portion, includes a first natural language instruction to generate a summary for the first transcript portion, and that excludes any other of the transcript portions; and causing the first text prompt to be processed (as input) using the large language model, to generate the first summary for the first transcript portion. In some implementations, generating the second summary includes: generating a second text prompt that includes the generated first summary, includes the second transcript portion, includes a second natural language instruction to generate a summary for the second transcript portion, and that excludes any other of the transcript portions; and causing the second text prompt to be processed using the large language model to generate the second summary for the second transcript portion.

In various implementations, optionally, the method further includes: generating an overall summary for the audio-based file based on the generated corresponding summaries; and in response to a request for a condensed version of the audio-based file, causing rendering of the overall summary for the audio-based file. In some implementations, causing rendering of the overall summary for the audio-based file includes: causing processing of the overall summary utilizing a speech synthesis model to generate corresponding audio data for the overall summary; and causing audible rendering of the corresponding audio data for the overall summary. In some implementations, causing rendering of the overall summary for the audio-based file further includes: causing processing of the audio-based file to extract one or more audio feature embeddings. In some implementations, causing processing of the overall summary utilizing the speech synthesis model to generate the corresponding audio data for the overall summary includes: causing processing of the overall summary and the one or more audio feature embeddings, utilizing the speech synthesis model, to generate the corresponding audio data for the overall summary in one or more voices derived from the audio-based file. In these implementations, optionally, the corresponding audio data can be rendered in response to a user request for audible rendering of the overall summary.

In some implementations, causing audible rendering of the corresponding audio data for the overall summary includes: causing audible rendering of audio data for the first summary in a first voice, and causing audible rendering of audio data for the second summary in a second voice.

In some implementations, the method further includes: prior to receiving the request, storing the corresponding audio data for the overall summary in association with the audio-based file.

It is noted that, while the method is described above with respect to an audio-based file, the method is applicable to streaming audio data. In this case, a transcript for the streaming audio data can be generated in real-time based on real-time speech recognition of the streaming audio data. The transcript for the streaming audio data can be automatically segmented every time a predefined token length (which is less than or equal to the maximum token length) is reached. For example, a first transcript portion for streaming audio data $(t_0 \sim t_1)$ having the predefined token length can be processed as input, using the generative model, in response to a token length of the first transcript portion becoming equal to the predefined token length. Processing such a first transcript portion, using the generative model, results in a first summary of the first transcript portion for streaming audio data $(0s \sim t_1)$. As the streaming continues, the first summary and a second transcript portion for streaming audio data $(t_1 \sim 2t_1)$ having the predefined token length can be processed as input, using the generative model, in response to a token length of the second transcript portion becomes equal to the predefined token length. Processing such a second transcript portion, using the generative model, results in a second summary of the first transcript portion for streaming audio data $(t_1 \sim 2t_1)$. As the streaming further continues, the second summary and a third transcript portion for streaming audio data $(2t_1 \sim 3t_1)$ having the predefined token length can be processed as input, using the generative model, in response to a token length of the third transcript portion reaches the predefined token length. Processing such a third transcript portion, using the generative model, results in a third summary of the first transcript portion for streaming audio data $(2t_1 \sim 3t_1)$.

It is further noted that, while the method is described above with respect to an audio-based file or streaming audio data, the method is applicable to other types of long-form content, such as natural language content (e.g., a thesis, report, survey, etc.) having a length that exceeds the maximum token length for the generative model.

The preceding is presented as an overview of only some implementations disclosed herein. These and other implementations are disclosed in additional detail herein. For example, additional and/or alternative implementations are disclosed herein such as those causing the overall summary (which is generated for the aforementioned audio-based file in an iterative manner) to be rendered in one or more voices based on one or more speaker embeddings predetermined for characters/narrators selected based on user input.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

FIG. 3 depicts a flowchart illustrating an example method of generating a summary for a transcript, in accordance with various aspects of the present disclosure.

FIG. 4 depicts a flowchart illustrating another example method of generating a summary for an audio-based file, in accordance with various aspects of the present disclosure.

DETAILED DESCRIPTION

The following description with reference to the accompanying drawings is provided for understanding of various implementations of the present disclosure. It's appreciated that different features from different embodiments may be combined with and/or exchanged for one another. In addition, those of ordinary skill in the art will recognize that various changes and modifications of the various embodiments described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor to enable a clear and consistent understanding of the present disclosure. Accordingly, it should be apparent to those skilled in the art that the following description of various embodiments of the present disclosure is provided for the purpose of illustration only and not for the purpose of limiting the present disclosure as defined by the appended claims and their equivalents.

Figure 1A:
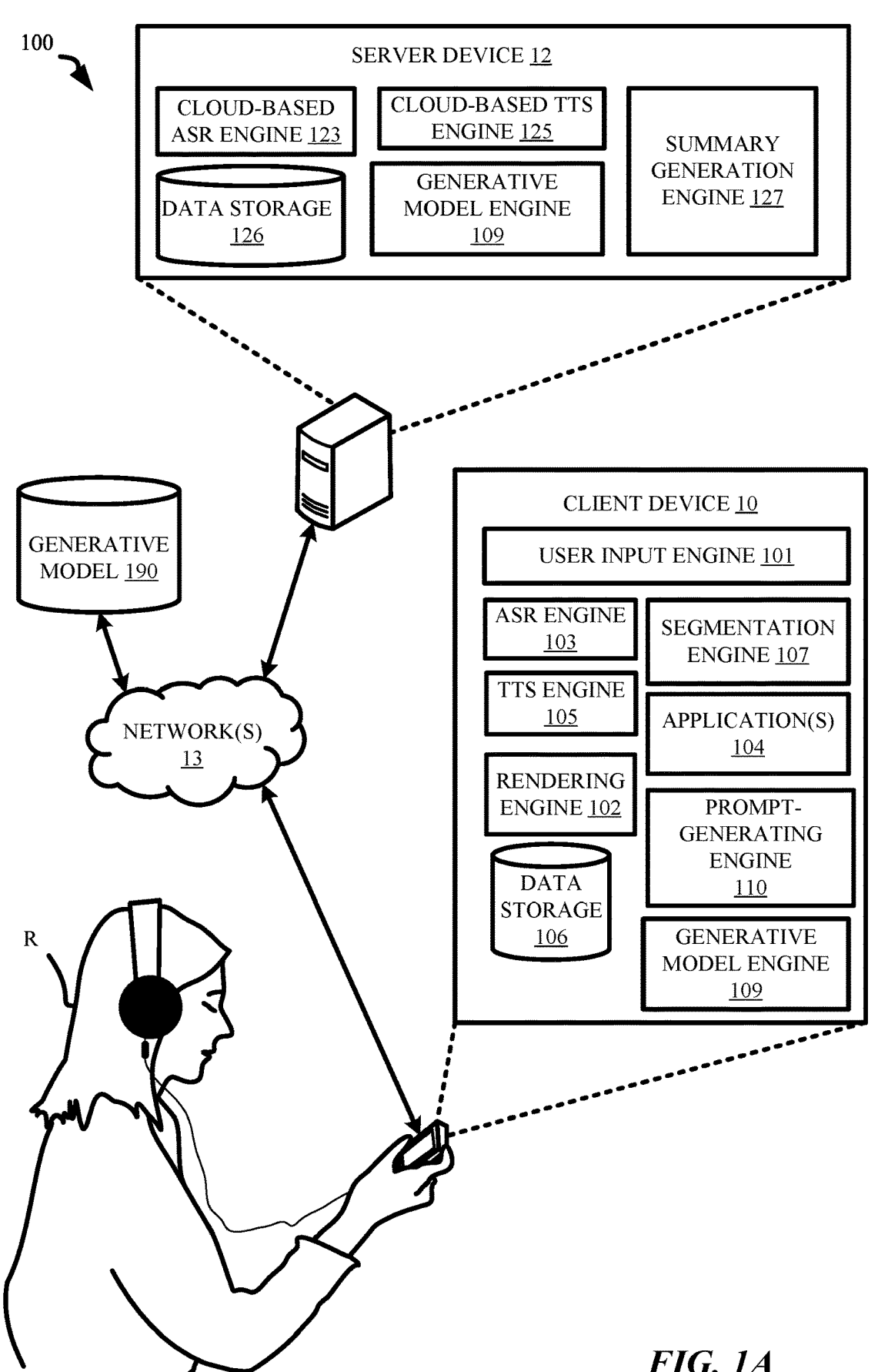
FIG. 1A depicts a block diagram of an example environment that demonstrates various aspects of the present disclosure, and in which some implementations disclosed herein can be implemented.

FIG. 1A is a block diagram of an example environment 100 that demonstrates various aspects of the present disclosure, and in which implementations disclosed herein may be implemented. As shown in FIG. 1A, the environment 100 can include a client computing device 10 ("client device"), and a server computing device 12 ("server device") in communication with the client computing device 10 via one or more networks 13. The one or more networks 13 can include, for example, a local area network (LAN), a wide area network (WAN) such as the Internet, and/or any other appropriate network.

The client computing device 10 can be, for example, a desktop computing device, a laptop computing device, a tablet computing device, a mobile phone computing device, a computing device of a vehicle (e.g., an in-vehicle entertainment system), an interactive speaker, a smart appliance such as a smart television, and/or a wearable apparatus that includes a computing device (e.g., glasses having a computing device, a smart watch, a virtual or augmented reality computing device), and the present disclosure is not limited thereto.

In various implementations, the client computing device 10 can include a user input engine 101 that is configured to detect user input provided by a user of the client computing device 10 using one or more user interface input devices. For example, the client computing device 10 can be equipped with a keyboard to receive typed input, and/or a mouse (or one or more hardware buttons) to receive a user click that selects one or more graphical user interface (GUI) elements that is rendered visually at a user interface of the client computing device 10. Additionally, or alternatively, the client computing device 10 can be equipped with one or more microphones that capture audio data, such as audio data corresponding to spoken utterances of the user or other sounds in an environment of the client computing device 10. Additionally, or alternatively, the client computing device 10 can be equipped with one or more vision components that are configured to capture vision data corresponding to images and/or movements (e.g., gestures) detected in a field of view of one or more of the vision components. Additionally, or alternatively, the client computing device 10 can be equipped with one or more touch sensitive components (e.g., a stylus, a touch screen, a touch panel, etc.) that are configured to capture signal(s) corresponding to touch input directed to the client computing device 10.

In various implementations, the client computing device 10 can include a rendering engine 102, and/or a storage 106. In various implementations, the rendering engine 102 can be configured to provide content (e.g., a natural language based response generated by an LLM) for audible and/or visual presentation to a user of the client computing device 10 using one or more user interface output devices. For example, the client computing device 10 can be equipped with one or more speakers that enable content to be provided for audible presentation to the user via the client computing device 10. Additionally, or alternatively, the client computing device 10 can be equipped with a display or projector that enables content to be provided for visual presentation to the user via the client computing device 10. The storage 106 can store various types of files and/or data. For instance, the storage 106 can store one or more audio-based files, such as one or more audiobooks, one or more songs, one or more audio recordings (e.g., recordings for meetings), and one or more videos. The storage 106 can alternatively or additionally store other applicable types of files or data such as a document, application data associated with one or more applications, user information (e.g., one or more user profiles for app(s) or device(s)) of a user of the client computing device 10, etc.

In various implementations, the client computing device 10 can further include a plurality of local components. The plurality of local components can include an automatic speech recognition (ASR) engine 103 and/or a text-to-speech (TTS) engine 105. In various implementations, the client computing device 10 can further include one or more applications 104 installed at, or accessible via, the client computing device 10. In some implementations, the one or more applications 104 can include an automated assistant (may also be known as "chatbot", "interactive assistant", etc., not illustrated in FIG. 1A), and the ASR engine 103 and/or the TTS engine 105 may be (but does not necessarily need to be) included in the automated assistant. In some implementations, the automated assistant (sometimes referred to as a "primary application" or "first-party application") can further include additional component(s), such as a NLU engine and/or a fulfillment engine. In some implementations, the one or more applications can include one or more third-party applications (e.g., application(s) that are developed by third-parties other than the party that develops or provides the automated assistant), and a user R of the client computing device 10 may have a registered account associated with the automated assistant and/or the one or more third-party applications. The one or more third-party applications can include, for example, a social media application, a video player, a note-taking application, a shopping application, a messaging application, and/or any other appropriate applications (or services), installed at (or accessible via) the client computing device 10.

The server computing device 12 can be, for example, a web server, one or more blade servers acting together to provide "cloud" infrastructure, or any other type of server as needed. In various implementations, the server computing device 12 can include cloud-based components the same as or similar to the plurality of local components installed at the client computing device 1. For example, the server computing device 12 can include a cloud-based ASR engine 123, a cloud-based TTS engine 125, a cloud-based NLU engine (not depicted), and/or a cloud-based fulfillment engine (not depicted).

The ASR engine 103 (and/or the cloud-based ASR engine 123) can process, using one or more streaming ASR models (e.g., a recurrent neural network (RNN) model, a transformer model, and/or any other type of ML model capable of performing ASR), streams of audio data that capture spoken utterances, to generate corresponding streams of ASR output. The audio data can be acquired from audio recordings or can be generated by microphone(s) of the client computing device 10. Notably, the streaming ASR model can be utilized to generate the corresponding streams of ASR output as the streams of audio data are generated.

The NLU engine and/or the cloud-based NLU engine (neither depicted in the Figures) can process, using one or more NLU models (e.g., a long short-term memory (LSTM), gated recurrent unit (GRU), and/or any other type of RNN or other ML model capable of performing NLU) and/or grammar-based rule(s), the corresponding streams of ASR output to generate corresponding streams of NLU output. The fulfillment engine and/or the cloud-based fulfillment engine (also not depicted) can cause the corresponding streams of NLU output to be processed to generate corresponding streams of fulfillment data. The corresponding streams of fulfillment data can correspond to, for example, corresponding given assistant outputs that are predicted to be responsive to spoken utterances captured in the corresponding streams of audio data processed by the ASR engine 103 (and/or the cloud-based ASR engine 123).

The TTS engine (e.g., 105 and/or 125) can process, using TTS model(s), corresponding streams of textual content to generate synthesized speech audio data that includes computer-generated synthesized speech. The corresponding streams of textual content can correspond to, for example, one or more given assistant outputs, one or more of modified given assistant outputs, and/or any other applicable textual content. The aforementioned ML model(s) can be on-device ML models that are stored locally at the client computing device 10, remote ML models that are executed remotely from the server computing device (e.g., at remote server device 12), or shared ML models that are accessible to both the client computing device 10 and/or remote systems (e.g., the remote server computing device 12). In additional or alternative implementations, corresponding streams of synthesized speech audio data corresponding to the one or more given assistant outputs, the one or more of modified given assistant outputs, and/or any other textual content described herein can be pre-cached in memory or one or more databases accessible by the client computing device 10.

In some implementations, the corresponding streams of ASR output can include, for example, streams of ASR hypotheses (e.g., term hypotheses and/or transcription hypotheses) that are predicted to correspond to spoken utterance(s) of a user that are captured in the corresponding streams of audio data, one or more corresponding predicted measures (e.g., probabilities, log likelihoods, and/or other values) for each of the ASR hypotheses included in the streams of ASR hypotheses, a plurality of phonemes that are predicted to correspond to spoken utterance(s) of a user that are captured in the corresponding streams of audio data, and/or other ASR output. In some versions of those implementations, the ASR engine 103 and/or 123 can select one or more of the ASR hypotheses as corresponding recognized text that corresponds to the spoken utterance(s) (e.g., selected based on the corresponding predicted measures).

In some implementations, the corresponding streams of NLU output can include, for example, streams of annotated recognized text that includes one or more annotations of the recognized text for one or more (e.g., all) of the terms of the recognized text, one or more corresponding predicted measures (e.g., probabilities, log likelihoods, and/or other values) for NLU output included in the streams of NLU output, and/or other NLU output. For example, the NLU engine may include a part of speech tagger (not depicted) configured to annotate terms with their grammatical roles.

Additionally, or alternatively, the NLU engine may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine may include a coreference resolver (not depicted) configured to group, or "cluster," references to the same entity based on one or more contextual cues. For example, the coreference resolver may be utilized to resolve the term "them" to "buy theater tickets" in the natural language input "buy them", based on "theater tickets" being mentioned in a client device notification rendered immediately prior to receiving input "buy them". In some implementations, one or more components of the NLU engine may rely on annotations from one or more other components of the NLU engine. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

In some implementations, the plurality of local components can include a generative model engine 109. In some other implementations, the generative model engine 109 can be included in the server computing device 12. However, the present disclosure is not limited thereto. The generative model engine 109 can be in communication with a generative model 190, for natural language content (e.g., a transcript for a long audio speech or other text) and/or other type of content to be processed using the generative model 190.

In some implementations, the client computing device 10 or the server device 12 can optionally include a prompt-generating engine 110, configured to generate a prompt (e.g., textual prompt) to be processed as input using the generative model 190. In some implementations, the prompt-generating engine 110 can be included in the generative model engine 109. In some implementations, the client computing device 10 can include a segmentation engine 107 configured to segment speech audio or a transcript of the speech audio.

In various implementations, the generative model 190 can be a smaller large language model (LLM) having less than 100 billion parameters, or can be a larger LLM that includes over 200 billion parameters. Being a larger LLM, the generative model 190 can assist in generating more accurate or sophisticated content (e.g., summary) responsive to a user query or request. The larger LLM may be stored at client computing device 10, or at the server computing device 12 (if the memory of the client computing device 10 restricts the storing of the larger LLM at the client computing device 10). Being a smaller LLM, the generative model 190 may be stored at the client computing device 10, thereby reducing a latency in rendering a summary for an audio book or other types of content (e.g., be it long-form content or short-form content, audio-based content or non-audio data), as the summary (after being generated) does not need to be transmitted via the one or more networks 13 to be rendered.

In some implementations, when the generative model 190 is stored at the client computing device 10, the maximum token length of content (e.g., text) processable using the generative model 190 may be a first maximum token length (e.g., 10,000). In some implementations, when the generative model 190 is stored at the server device 12, the maximum token length of content (e.g., text) processable using the generative model 190 may be a second maximum token length (e.g., 30,000) that is greater than the first maximum token length.

In some implementations, the generative model 190 is a sequence-to-sequence model, is transformer-based, and/or can include an encoder and/or a decoder. One non-limiting example of an LLM is GOOGLE'S Pathways Language Model (PaLM). Another non-limiting example of an LLM is GOOGLE'S Language Model for Dialogue Applications (LaMDA).

In some implementations, the segmentation engine 107 can be configured to segment speech audio (or a transcript of the speech audio) based on one or more factors (e.g., user input that selects a portion of the speech audio, chapters of an audiobook, memory constraint of the client computing device 10, maximum token length of the generative model 190, etc.). In some implementations, the segmentation engine 107 can segment the transcript of the speech audio into a plurality of transcript portions which includes a first transcript portion and a second transcript (and in some cases, more than the first and second transcript portions) when a total length of the transcript of the speech audio exceeds a predetermined length (which, for instance, corresponds to the maximum token length of the generative model 190). In some implementations, the first transcript portion and the second transcript portion segmented from the transcript of the speech audio can have the same token length, e.g., each have a token length that is approximately 80% or 90% (or other pre-defined percentage) of the maximum token length. In some other implementations, the first transcript portion and the second transcript portion can have different token lengths. For instance, the first transcript portion can have a first token length that is approximately 90% of the maximum token length, and the second transcript portion can have a second token length that is approximately 80% of the maximum token length.

The prompt-generating engine 110 can generate a first prompt applicable to generate a summary for the first transcript portion ("first summary") and a second prompt applicable to generate a summary for the second transcript portion ("second summary"). As a non-limiting example, the first prompt can include the first transcript portion and/or a first instruction to generate a first summary for the first transcript portion, and the second prompt can include the first summary, the second transcript portion and/or a second instruction to generate a summary for the second transcript portion in view of the first summary. In case the plurality of transcript portions includes the first transcript portion, the second transcript, and a third transcript that is in addition to the first and second transcript portions, the prompt-generating engine 110 can generate a third prompt applicable to generate a summary for the third transcript portion ("third summary"). The third prompt can include the second summary, the third transcript portion, and/or a third instruction to generate a summary for the third transcript portion in view of the second summary. By including the second summary but excluding the first summary/the first transcript portion/ the second transcript portion in the third prompt, not only the context/content of the second transcript portion is considered in generating the third summary to enhance a transition from the second summary to the third summary, but also a token length of the third prompt may stay less than the maximum token length of the generative model 190, for the third prompt to be processable as direct input using the generative model 190.

Similarly, in case the plurality of transcript portions includes the first transcript portion, the second transcript portion, . . . , and an $N^{th}$ transcript portion, the prompt-generating engine 110 can generate an $N^{th}$ prompt processable (by the generative model 190) to generate a summary for the $N^{th}$ transcript portion. The $N^{th}$ prompt can include a (N-1)th summary, the $N^{th}$ transcript portion, and/or an instruction to generate a summary ("the $N^{th}$ summary") for the $N^{th}$ transcript portion in view of the (N-1)th summary.

In some implementations, the generative model 190 can be fine-tuned, e.g., in a supervised manner, so that the first instruction can be omitted from the first textual prompt (i.e., "first prompt" that is to be processed using the generative model 190), the second instruction can be omitted from the second textual prompt ("second prompt") that is to be processed using the generative model 190), . . . , and the $N^{th}$ instruction can be omitted from the $N^{th}$ textual prompt ("$N^{th}$ prompt") that is to be processed using the generative model 190. The generative model 190 can be fine-tuned, for instance, using one or more training instances. Each of the one or more training instances includes a text as training instance input and includes a summary for the text as a ground truth output (to be compared with a training instance output generated by processing the training instance input using the generative model). By fine-tuning the generative model using the one or more training instances that each include a text as training instance input and a summary for the text as a ground truth output, the first transcript portion (e.g., without the first instruction) can be processed as input using the fine-tuned generative model, to generate the first summary. The first summary and the second transcript portion (e.g., without the second instruction) can be processed as input using the fine-tuned generative model, to generate the aforementioned second summary.

Put another way, the first instruction to generate a summary for the first transcript portion can be omitted from the first textual prompt, and only the first transcript portion is processed (e.g., using the fine-tuned generative model) to generate the first summary. The second instruction to generate a summary for the second transcript portion can be omitted from the first textual prompt, and only the first summary and the second transcript portion are processed (e.g., using the fine-tuned generative model) to generate the second summary . . . . The $N^{th}$ instruction to generate an $N^{th}$ summary for the $N^{th}$ transcript portion can be omitted from the $N^{th}$ textual prompt, and only the (N-1)th summary and the $N^{th}$ transcript portion are processed as input (e.g., using the fine-tuned generative model) to generate the $N^{th}$ summary.

In some implementations, a summary generation engine 127 (which can be accessed at the client device 10 and/or the server device 20) can generate an overall summary for the speech audio based on the first summary for the first transcript portion, the second summary for the second transcript portion, . . . , and the $N^{th}$ summary for the $N^{th}$ transcript portion. For instance, the overall summary for the speech audio can be generated by combining the first summary for the first transcript portion, the second summary for the second transcript portion, . . . , and the $N^{th}$ summary for the $N^{th}$ transcript portion. In some implementations, audio data for the overall summary can be generated. For instance, the audio data for the overall summary can be generated in a voice of a character used to provide the speech audio from which the overall summary is derived. The audio data for the overall summary can also be generated in more than one voice, and detailed descriptions are provided later in this disclosure.

In some implementations, the overall summary and/or the audio data of the overall summary can be stored (e.g., at the data storage 106 or 126) in association with the speech audio (e.g., from an audiobook, meeting recording) for which the overall summary is generated. By storing the audio data of the overall summary, the audio data of the overall summary can be retrieved and rendered audibly in response to a user request for a summary of the speech audio. This saves latency (e.g., a delay) between receiving the user quest for the summary of the speech audio and rendering the audio data of the overall summary. For instance, in response to receiving the user request, the rendering engine 102 can cause the summary for the audio data to be rendered audibly and/or visually.

In some implementations, the first summary for the first transcript portion can be stored in the data storage 106 (or 126, or other databases) in association with the first transcript portion (or an audio clip that is of the speech audio and that corresponds to the first transcript portion). The second summary for the second transcript portion can be stored in the data storage 106 (or 126, or other databases) in association with the second transcript portion (or an audio clip that is of the speech audio and that corresponds to the second transcript portion) . . . . The $N^{th}$ summary for the $N^{th}$ transcript portion can be stored in the data storage 106 (or 126, or other databases) in association with the $N^{th}$ transcript portion (or an audio clip that is of the speech audio and that corresponds to the $N^{th}$ transcript portion).

By segmenting the transcript of the speech audio (or by segmenting the speech audio) and generating summaries in an iterative manner as described above, memory constraints in utilizing the generative model to process long-form content (e.g., a transcript of speech audio that is of particularly long length, a long thesis, etc.) can be lessened. For instance, a computing device with a relatively small memory can generate an overall summary of the speech audio (or a plurality of summaries each for a subset of the speech audio), based on processing of the speech audio (or a transcript thereof) in the iterative manner using the generative model.

Figure 1B:
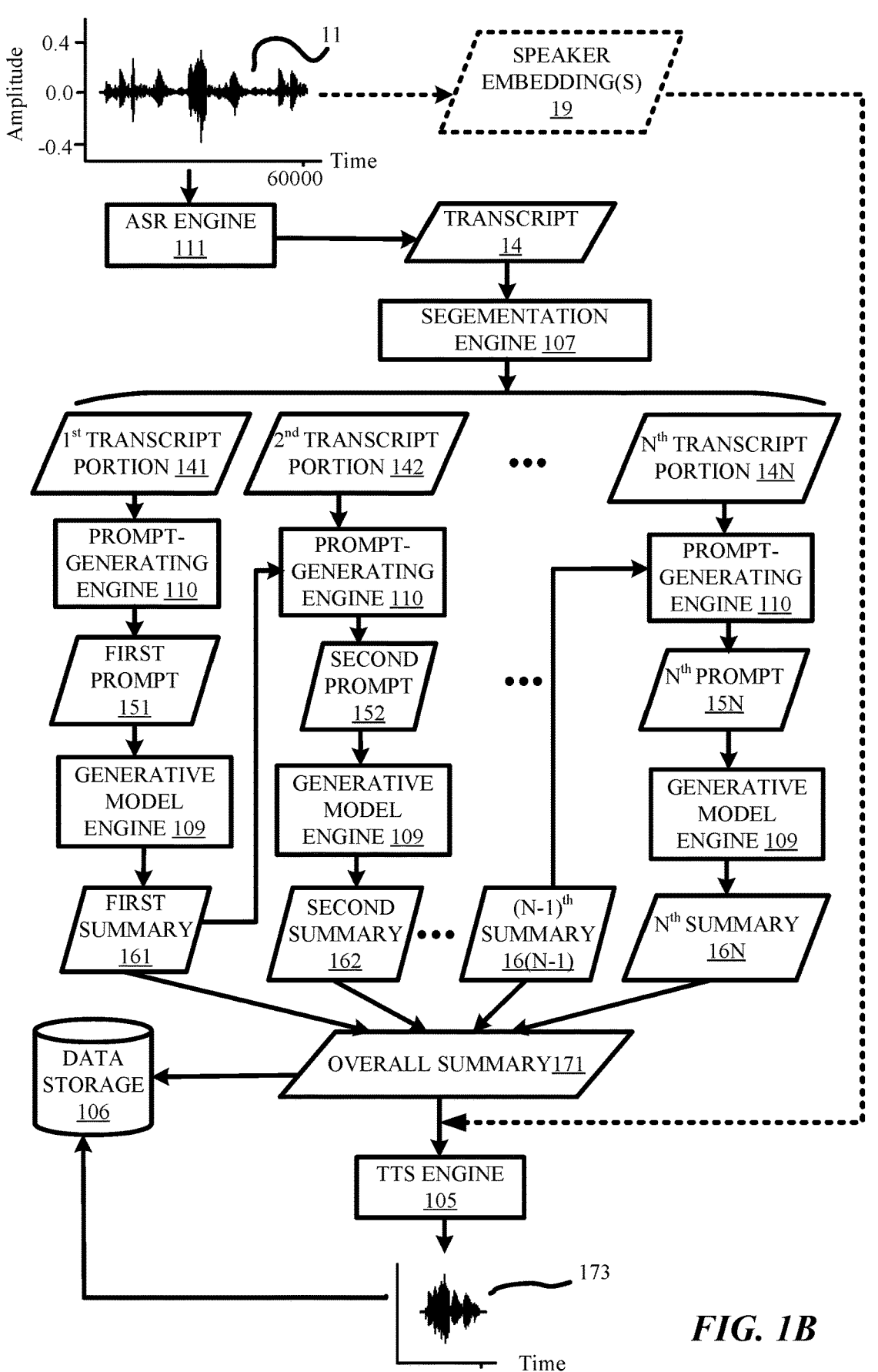
FIG. 1B illustrates an example of determining one or more summaries that demonstrates various aspects of the present disclosure, and in which some implementations disclosed herein can be implemented.

FIG. 1B illustrates an example of determining one or more summaries (e.g., the aforementioned first summary, second summary, etc.) that demonstrates various aspects of the present disclosure, and in which some implementations disclosed herein can be implemented. As shown in FIG. 1B, speech audio 11 (e.g., in the form of a raw audio waveform) capturing user utterance(s) can be received and processed by the ASR engine 111 using one or more ASR models, to generate a transcript 14 for the speech audio 11. The speech audio 11 can be acquired from an audiobook, from a video, or from other sources. In some implementations, the speech audio 11 can have a length (e.g., 60,000 seconds) exceeding a length threshold, which makes it almost impossible for the transcript 14 of the speech audio 11 to be processed using a generative model all at once (e.g., in a single iteration of processing using the generative model).

Accordingly, the transcript 14 of the speech audio 11 can be divided/segmented by the segmentation engine 107 into a plurality of transcript portions, such as a first transcript portion 141 (e.g., a first chapter, a first story, a first meeting session, a first portion having a token length that is of a first percentage of a maximum token length, etc.), a second transcript portion 142 (e.g., a second chapter, a second story, a second meeting session, a second portion having a token length that is of a second percentage of the maximum token length, etc.), . . . , and an $N^{th}$ transcript portion 14N (e.g., an $N^{th}$ first chapter, an $N^{th}$ story, an $N^{th}$ meeting session, an $N^{th}$ portion having a token length that is of an $N^{th}$ percentage of a maximum token length, etc.). Each of the plurality of transcript portions can be processed using the prompt-generating engine 110, to generate a corresponding prompt (e.g., 151, 152, . . . 15N). Optionally, the second percentage (or the third, . . . , or the $N^{th}$ percentage) can be less than or equal to the first percentage, so that the second textual prompt (including the first summary, the second transcript portion, and/or the second instruction), which is longer than or equal to the first textual prompt, can be processed as input using a generative model (e.g., the generative model 190 at the computing device 10), to avoid or reduce the risk of the second textual prompt being too long to be processed.

In some implementations, the prompt-generating engine 110 can generate a first prompt 151 to include the first transcript portion 141 and/or an instruction to generate a summary for the first transcript portion 141. The first prompt 151 can be processed by the generative model engine 109 using the generative model 190, to generate a first model output from which the summary (i.e., the first summary 161) for the first transcript portion 141 is determined. The prompt-generating engine 110 can generate a second prompt 152 to include the second transcript portion 142 and/or an instruction to generate a summary for the second transcript portion 142 in view of the first summary 161, to generate a second model output from which the summary (i.e., the second summary 162) is determined . . . . The prompt-generating engine 110 can generate an $N^{th}$ prompt 15N that includes the $N^{th}$ transcript portion 14N and/or an instruction to generate a summary for the $N^{th}$ transcript portion 14N in view of a (N-1)th summary 16 (N-1), to generate an $N^{th}$ model output from which the $N^{th}$ summary is determined, where N is greater than or equal to 2.

In some implementations, an overall summary 171 can be generated by combining the first summary 161, the second summary 162, . . . , and the $N^{th}$ summary 16N. In some implementations, audio data 173 for the overall summary can be generated based on processing the overall summary 171 using the TTS engine 105. In some implementations, the audio data 173 for the overall summary can be rendered in response to receiving a user input that requests an overall summary. In some implementations, the overall summary 171 and/or the audio data 173 for the overall summary can be stored at the data storage 106 (or other data storage such as the data storage 126), in association with the speech audio 11.

In some implementations, audio data for the first summary 161, audio data for the second summary 162, . . . , and audio data for the $N^{th}$ summary 16N can be generated. In these implementations, the first summary 161 and/or the audio data for the first summary 161 can be stored (e.g., at the data storage 106) in association with the first transcript portion 141 (and/or the speech audio 11), the second summary 162 and/or the audio data for the second summary 162 can be stored (e.g., at the data storage 106) in association with the second transcript portion 142 (and/or the speech audio 11), . . . , and the $N^{th}$ summary 16N and/or the audio data for the $N^{th}$ summary 16N can be stored (e.g., at the data storage 106) in association with the $N^{th}$ transcript portion 14N (and/or the speech audio 11). This enables one or more transcript portions (and/or audio data thereof) to be selectively rendered visually and/or audibly to a user in response to user input that selects the one or more transcript portions (and/or the audio data thereof).

Optionally, as shown in FIG. 1B, speaker embedding(s) can be determined from the speech audio 11, and the audio data for the overall summary 171 can be generated based on the speaker embedding(s) determined from the speech audio 11. Optionally, a user may be provided with one or more voice options (e.g., via a user interface of the client device 10) to select a speaker voice for the audio data of the overall summary (or other summaries such as the first summary 161, the second summary 162, etc.). In response to the user selecting a speaker voice, a speaker embedding predetermined for the selected speaker voice can be applied to generate the audio data of the overall summary (or other summaries), so that such audio data is rendered to the user in the selected speaker voice.

Optionally, the transcript 14 can include one or more speaker tags (e.g., tag of narrators that provide speeches of the speech audio 11). Optionally, the transcript portions (e.g., 141, . . . , 14N) segmented from the transcript 14 can each include one or more of the speaker tags. As a non-limiting example, the first transcript portion 141 can include a first speaker tag assigned to one or more sentences and include a second speaker tag assigned to the rest sentences. Alternatively or additionally, the second transcript portion 142 can include a third speaker tag assigned to all sentences in the second transcript portion 142. Alternatively or additionally, the $N^{th}$ transcript portion 14N can include a fourth speaker tag assigned to one or more sentences in the $N^{th}$ transcript portion 14N, a fifth speaker tag assigned to one or more additional sentences in the $N^{th}$ transcript portion 14N, and a sixth speaker tag assigned to rest sentences in the $N^{th}$ transcript portion 14N. In this non-limiting example, the first summary 161 can include one or more sentences associated with the first and/or the second speaker tag, the second summary 162 can include one or more sentences associated with the third speaker tag, . . . , and the $N^{th}$ summary 16N can include one or more sentences associated with the fourth, fifth, and/or sixth speaker tags.

Continuing with the non-limiting example above, audio data for the first summary 161 can be generated based on the first and/or second speaker tags, audio data for the second summary 162 can be generated based on the third speaker tag (e.g., having a voice synthesized based on the third speaker tag), . . . , and audio data for the $N^{th}$ summary 16N can be generated based on the fourth, fifth, and/or sixth speaker tags. Continuing with this non-limiting example above, the overall summary 171 can include one or more of the first to sixth speaker tags, and audio data for the overall summary 171 can be generated based on the one or more of the first to sixth speaker tags. For instance, the overall summary 171 can include one or more sentences (from the first summary 161) associated with the first speaker tag, one or more additional sentences (from the second summary 162) associated with the third speaker tag, . . . , and one or more further sentences (from the $N^{th}$ summary 16N) that include a first sentence associated with the fourth speaker tag and a second sentence associated with the sixth speaker tag. In this case, audio data for the overall summary 171 can be generated to reflect the associations between the one or more sentences and the first speaker tag, the associations between the one or more additional sentences and the third speaker tag, . . . , and the associations between the first sentence and the fourth speaker tag and between the second sentence and the sixth speaker tag. For instance, the one or more sentences (from the first summary 161) can be audibly rendered in a voice of a first speaker corresponding to the first speaker tag, the one or more additional sentences (from the second summary 162) can be audibly rendered in a voice of a third speaker corresponding to the third speaker tag, . . . , and the first sentence can be audibly rendered in a voice of a fourth speaker corresponding to the fourth speaker tag while the second sentence can be audibly rendered in a voice of a sixth speaker that the sixth speaker tag corresponds to.

Figures 1C, 1D:
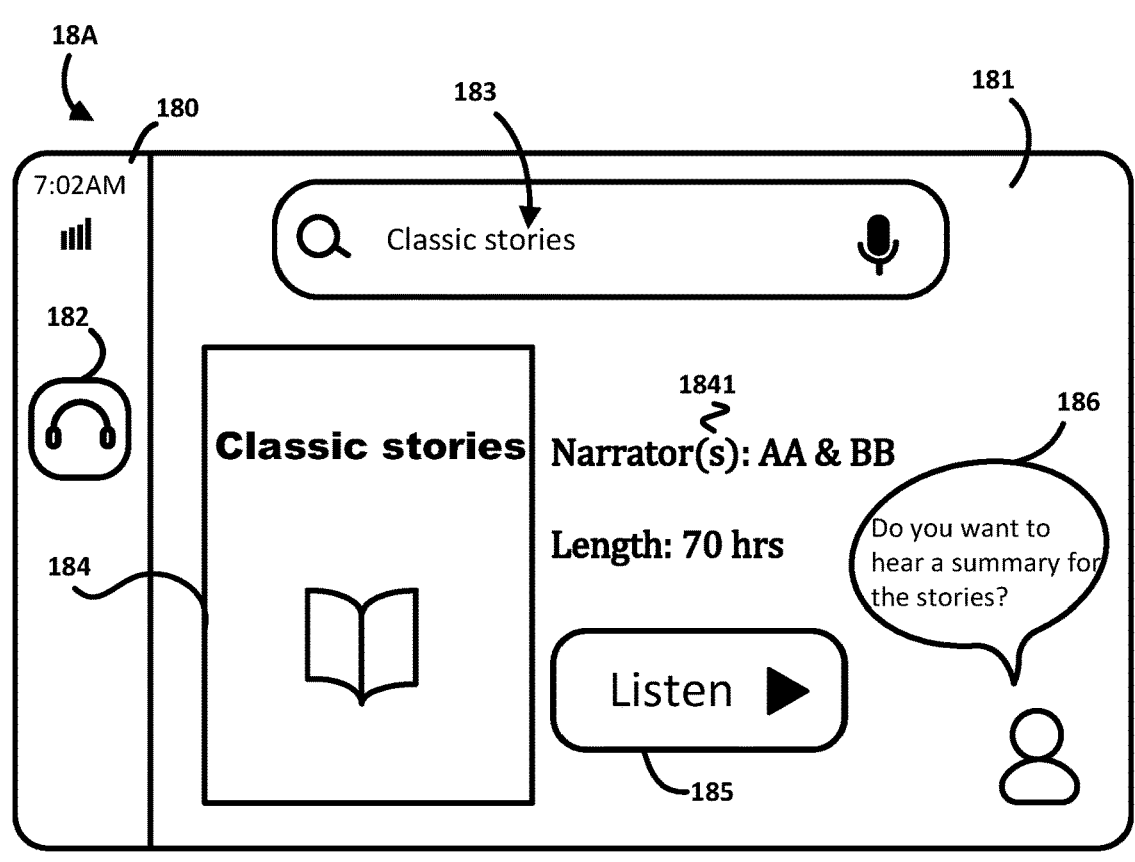
FIG. 1C illustrates an example of a user interface that demonstrates various aspects of the present disclosure, and in which some implementations disclosed herein can be implemented.
FIG. 1D illustrates an example of an additional user interface that demonstrates various aspects of the present disclosure, and in which some implementations disclosed herein can be implemented.

FIG. 1C illustrates an example of a user interface 18A that demonstrates various aspects of the present disclosure, and in which some implementations disclosed herein can be implemented. FIG. 1D illustrates an example of an additional user interface 18B that demonstrates various aspects of the present disclosure, and in which some implementations disclosed herein can be implemented. As a non-limiting example, the user interface 18A and the user interface 18B can each be rendered via an in-vehicle system, via a mobile device, or via other systems such as a laptop, a smart speaker, etc.

As shown in FIG. 1C, the user interface 18A can include a first portion 180 displaying information such as time, signal strength, an application 182 (e.g., radio app or audio-book app, etc.) running in a foreground of the in-vehicle system (or any other applicable system or device). The user interface 18A can further include a second portion 181. The second portion 181 of the user interface 18A can include an input field 183 to receive and/or display user input (typed and/or audible user input). For instance, a user can provide an audio input/utterance (e.g., a spoken request of "classic stories") requesting a particular audio file (e.g., an audio-book named "classic stories") to the in-vehicle system, and a speech recognition/transcript ("classic stories" in natural language) of the audio input can be displayed within the input field 183.

In some implementations, the in-vehicle system can include or otherwise access an automated assistant as described above, where in response to receiving the audio input (e.g., a spoken request of "classic stories") requesting the particular audio file (e.g., audio book named "classic stories"), a search for the particular audio file can be performed by the automated assistant within a designated database (e.g., a database storing audiobooks accessible via the application 182). For instance, the search can result in an image 184 (and/or other information 1841) associated with the particular audio file (e.g., audio book named "classic stories") to be rendered within the user interface 18A. Such image 184 can correspond to a cover image of the particular audio file (e.g., audio book named "classic stories"), and the other information 1841 can include name(s) of narrator(s) for the particular audio file, a length (e.g., 70 hours) of the particular audio file, etc. In some implementations, one or more buttons (or other types of GUI elements) can be visually rendered at the user interface 18A, with respect to the image 184 for the particular audio file (e.g., audio book named "classic stories"). For instance, the one or more buttons can include a selectable graphical user interface (GUI) element 185 ("listen") which, when selected, causes the particular audio file to be played.

In some implementations, referring again to FIG. 1C, the automated assistant may generate, based on a result of the search (e.g., the particular audio file named "classic stories"), a synthesized utterance 186 (e.g., "Do you want to hear a summary for the stories?") asking whether the user wants to hear a summary of the particular audio file. The automated assistant may cause the synthesized utterance 186 to be provided to a user of the in-vehicle system. Optionally, the automated assistant can cause the synthesized utterance 186 (e.g., "Do you want to hear a summary for the stories?"), for instance, at a time when a predefined duration (e.g., 5 seconds) has passed before receiving any additional user input since the rendering of the search result that lists/shows the particular audio file named "classic stories". In response to receiving user confirmation (e.g., an utterance of "Yes") from the user, an overall summary for the particular audio file can be played.

In some implementations, the overall summary and/or audio data for the overall summary can be generated prior to receiving user confirmation. In some other implementations, the overall summary and/or audio data for the overall summary can be generated in response to receiving user confirmation. Optionally, the audio data for the overall summary can be synthesized (e.g., using the aforementioned TTS engine) and rendered in a voice of a narrator AA and/or in an additional voice of a narrator BB, as shown in FIG. 1C.

Referring to FIG. 1D, in some implementations, the in-vehicle system can include or access no automated assistant. In these implementations, an additional selectable GUI element 187 can be rendered along with the button ("listen") 185 within the user interface 18B, for a user to determine/ select whether to listen to the audio data for the summary 187, or the audio data for the particular audio file (e.g., having a length of approximately 70 hours).

Figure 2A:
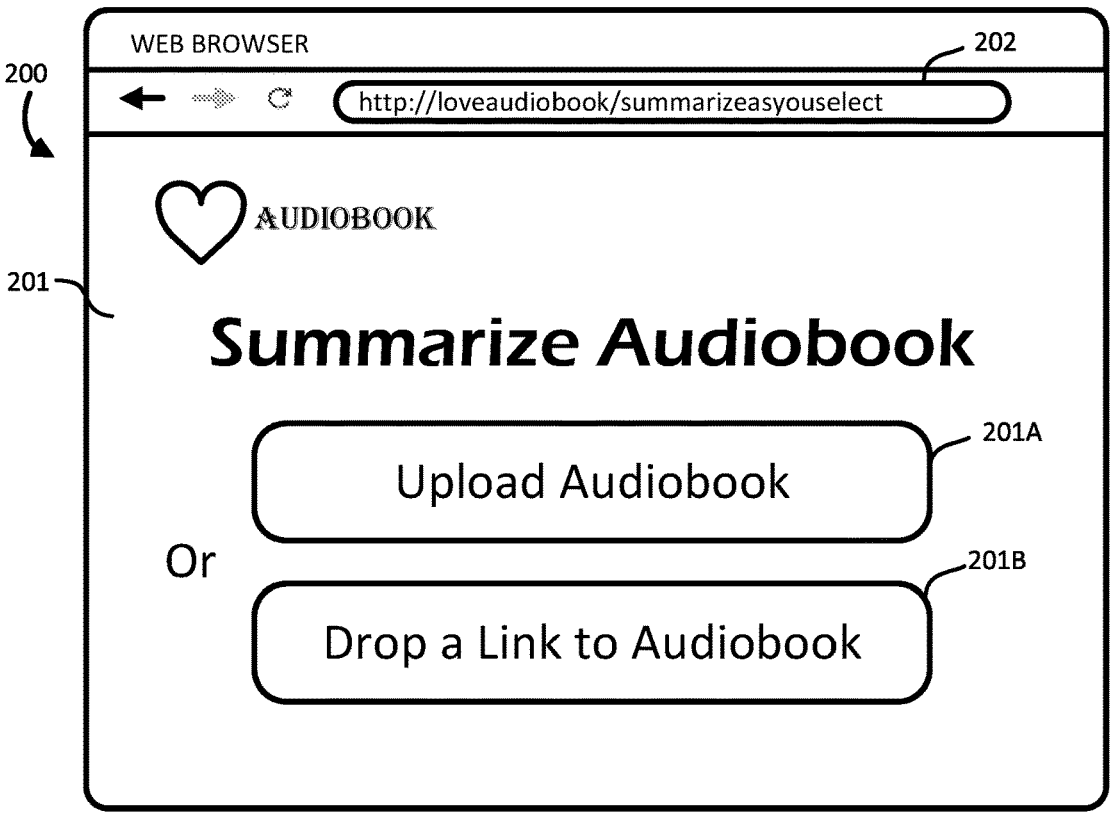
FIG. 2A, FIG. 2B, FIG. 2C, FIG. 2D, and FIG. 2E depict various scenarios, in accordance with various aspects of the present disclosure.

FIG. 2A, FIG. 2B, FIG. 2C, and FIG. 2D depict various scenarios, in accordance with various aspects of the present disclosure. As shown in FIG. 2A, a user can access a user interface 201 for summarizing audiobooks (or other audio data or audio file), where the user interface 201 is rendered via a client device 200. The user interface 201 can be of a web-based application (e.g., named "love-audiobook", or any other name, reflected by 220 or an address field 202) that is accessible via the client device 200 (e.g., via a web browser), or the user interface 201 can be of an application installed at the client device 200.

The user interface 201 for summarizing audiobooks can, for instance, include a first input field 201A that is configured to receive an audio file from a user, and/or a second input field 201B to receive a link (or address) from the user to an audio file.

Figure 2B:
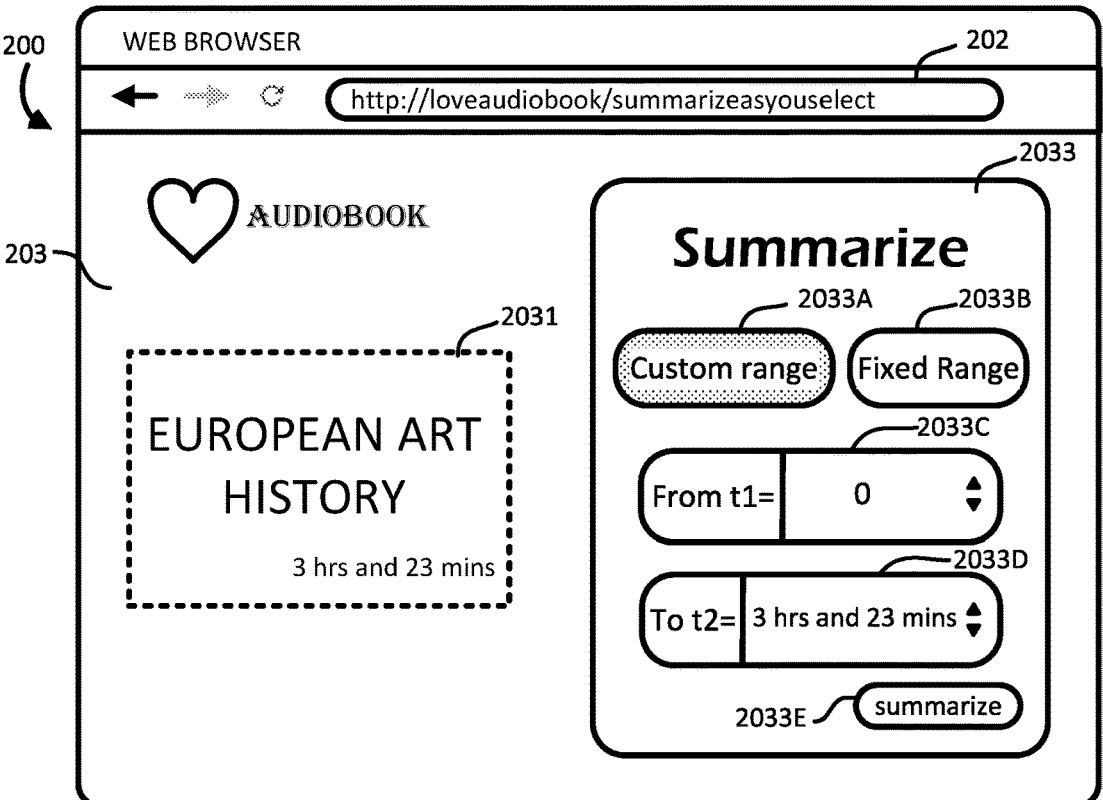

Referring to FIG. 2B, in response to receiving user input (via the first input field 201A or the second input field 201B) that specifies an audiobook (e.g., "European Art History"), a user interface 203 can be rendered via the client device 200. The user interface 203 can include a first portion 2031 describing (or relating to) the audiobook and a second portion 2033 relating to audiobook summarization.

The second portion 2033 relating to audiobook summarization can include a first user graphical interface (GUI) element 2033A and a second GUI element 2033B. In some implementations, the first GUI element 2033A, by default, can be rendered along with one or more additional GUI elements (e.g., 2033C, 2033D, 2033E, etc.). Alternatively or additionally, the first GUI element 2033A can be selectable, and when selectable, can cause the one or more additional GUI elements to be rendered within the second portion 2033. The one or more additional GUI elements can include, for instance, a third GUI element 2033C including an user-input field to receive first user input (e.g., "1 hr", or the user input-input field can have a default value of "0") that designates a starting point ("t1") of the audiobook (or other types of audio file) to be summarized, and can include a fourth GUI element 2033D including an additional user-input field to receive second user input (e.g., "3 hrs", or the additional user-input field can be filled with a default value consistent with a total length (e.g., 3 hrs and 23 mins) of the audiobook specified by the user input) that designates an ending point ("t2") of the audiobook to be summarized. The one or more additional GUI elements can further include a fifth GUI element 2033E that is activated in response to the user-input field (of the third GUI element 2033C) receiving user input that designates the starting point of the audiobook to be summarized and the additional user-input field (of the fourth GUI element 2033D) receiving user input that designates the ending point of the audiobook to be summarized. The fifth GUI element 2033E can be a "summary" button that, once activated, becomes selectable, and when selected (e.g., when clicked by the user), causes a selected portion of the audiobook (that begins with the starting point of the audiobook designated by the first user input and that ends with the ending point of the audiobook designated by the second user input) to be summarized.

In some implementations, in response to the fifth GUI element 2033E being selectable, a transcript that corresponds to the selected portion of the audiobook (e.g., "European Art History") is obtained.

Optionally, in response to the fifth GUI element 2033E being selectable, a length of the selected portion of the audiobook can be determined. If the length of the selected portion of the audiobook exceeds a predetermined length threshold (which can be determined based on or subject to memory constraint of the client device 200 and/or the maximum token length of a large language model that is accessible via the application named "love-audiobook" and that is used to perform summarization), the transcript of the selected portion of the audiobook can be segmented into a plurality of transcript portions. The plurality of transcript portions can include, for instance, at least a first transcript portion and a second transcript portion, where each of the first and second transcript portions have a token length that is less than or equal to the maximum token length of the large language model (e.g., the generative model 190).

For each of the plurality of transcript portions, a summary for a respective transcript portion can be generated based on processing the respective transcript portion using the large language model. For instance, a first summary summarizing the first transcript portion can be generated by: generating a first text prompt that includes the first transcript portion, includes a first natural language instruction to generate a summary for the first transcript portion, and that excludes any other of the transcript portions; and causing the first text prompt to be processed using the large language model to generate the first summary for the first transcript portion. A second summary summarizing the second transcript portion can be generated by: generating a second text prompt that includes the generated first summary, includes the second transcript portion, includes a second natural language instruction to generate a summary for the second transcript portion, and that excludes any other of the transcript portions; and causing the second text prompt to be processed using the large language model to generate the second summary for the second transcript portion.

Figure 2C:
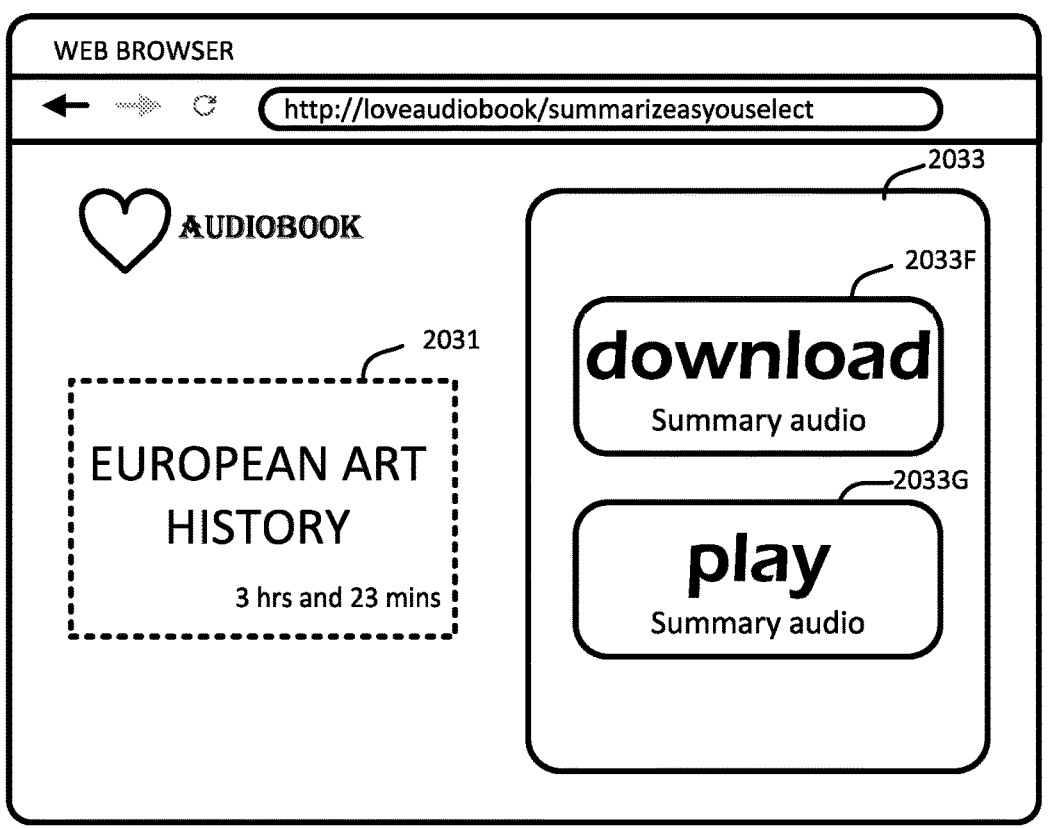

In some implementations, an overall summary for the audiobook (e.g., "European Art History", or the selected portion thereof, or other audio-based file) can be generated based on the generated corresponding summaries, and/or audio data for the overall summary can be generated. The overall summary and/or the audio data for the overall summary for the selected portion of the audiobook can be rendered to the user via the client device 200 in response to the fifth GUI element 2033E being selectable (or in response to receiving other types of request for a condensed version of the audiobook (e.g., "European Art History") or the selected portion thereof. In some implementations, as shown in FIG. 2C, in response to the fifth GUI element 2033E being selectable, a "download" button 2033F can be rendered for a user to download an audio file that contains the audio data for the overall summary for the selected portion (e.g., t1~t2) of the audiobook (e.g., "European Art History"). The "download" button 2033F, for instance, can be embedded with a link to the audio file that contains the audio data for the overall summary. Alternatively or additionally, in response to the fifth GUI element 2033G being selectable, a "PLAY" button 2033G can be rendered for a user to play the audio file that contains the audio data for the overall summary.

Figure 2D:
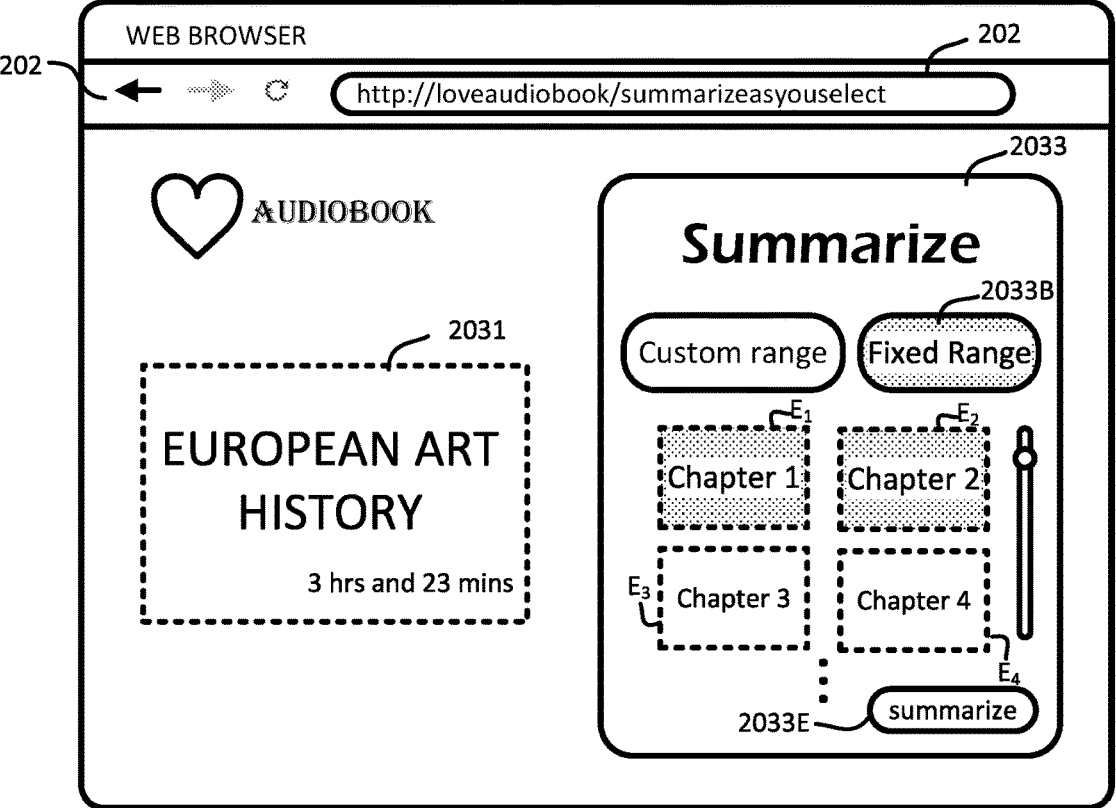

Referring to FIG. 2D, the second GUI element 2033B can be selectable, and when selectable, can cause one or more further GUI elements to be rendered within the second portion 2033. For instance, the one or more further GUI elements can include a plurality of GUI elements E1~En (e.g., E1, E2, E3, E4 . . . ) each corresponding to a chapter of the audiobook, where each of the plurality of GUI elements is selectable. The fifth GUI element 2033E can be activated in response to one or more of the plurality of GUI elements E1~En being selected. In response to the fifth GUI element 2033E being selected, the GUI element(s) that are selected by the user can be determined and one or more summaries can be determined. For instance, assume a first GUI element E1 and a second GUI element E2 are selected and remain selected when the user selects the fifth GUI element 2033E, a first summary can be generated for the first element E1 that represents the first chapter of the audiobook and a second summary can be generated for the second element E2 that represents the second chapter of the audiobook. The first summary (and/or audio data for the first summary) and/or the second summary (and/or audio data for the second summary) can be generated in an interactive manner as described above.

Figure 2E:
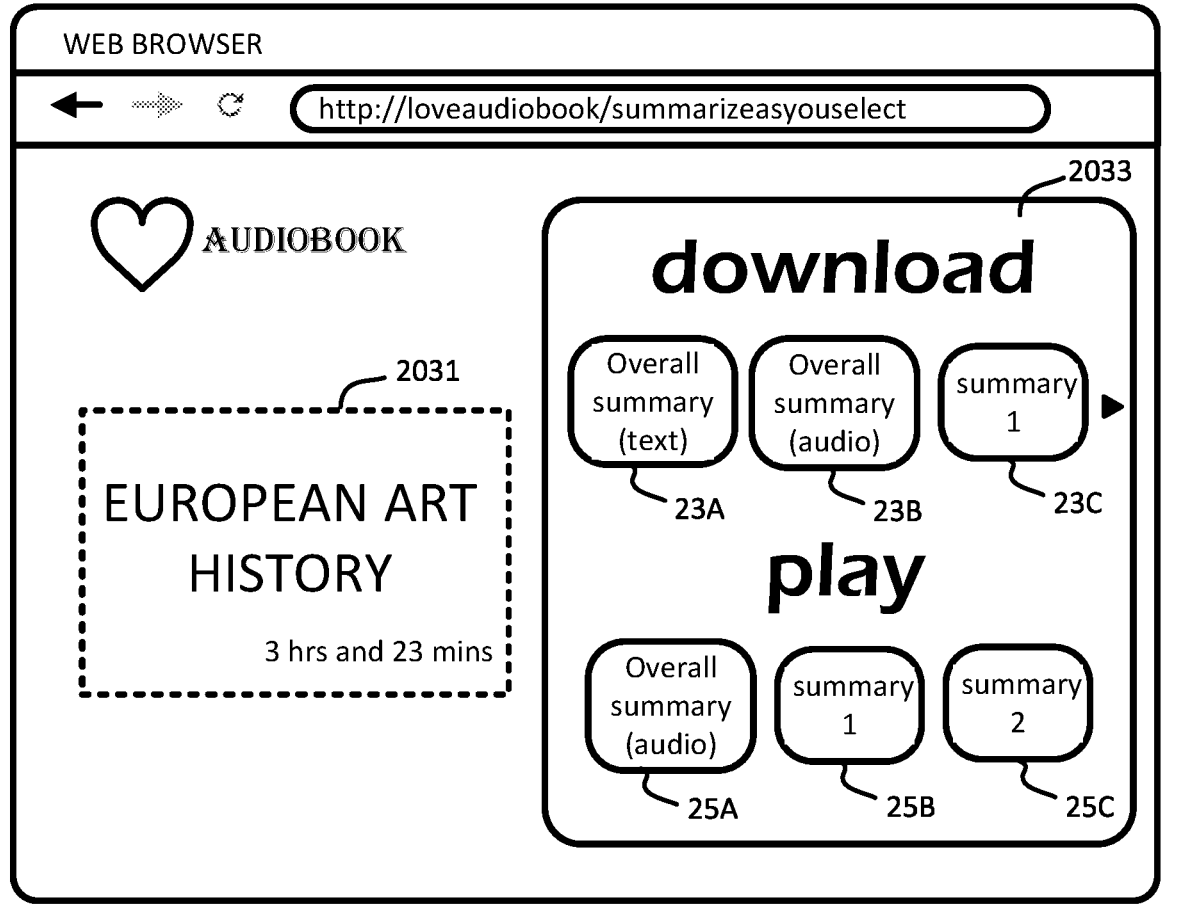

In some implementations, the first summary (and/or audio data for the first summary) can be stored in association with the first chapter of the audiobook. The second summary (and/or audio data for the second summary) can be stored in association with the second chapter of the audiobook. For instance, referring to FIG. 2E, in response to the fifth GUI element 2033E being selected and in response to the first/second summary (and/or audio data for the first/second summary) being determined/generated, a plurality of buttons can be rendered, where the plurality of buttons can include a first set of buttons for downloading file(s), and a second set of buttons for triggering rendering of a file.

The first set of buttons can include, for instance, a button 23A to download an overall summary for the audiobook "European Art history" in natural language, a button 23B to download an audio file for the overall summary for the audiobook "European Art history", a button 23C for a first summary for the user-selected chapter 1 of the audiobook "European Art history" (in natural language and/or audio data), and a fourth button (not shown) for a second summary for the user-selected chapter 2 of the audiobook "European Art history" (in natural language and/or audio data).

The second set of buttons can include, for instance, a button 25A to audibly (or visually) render audio data generated for the an overall summary of the audiobook "European Art history", a button 25B to audibly (or visually) render the first summary ("summary 1") for the user-selected chapter 1 of the audiobook "European Art history", a button 25C to audibly (or visually) render the second summary ("summary 2") for the user-selected chapter 2 of the audiobook "European Art history".

It is noted that while specific arrangement, shape, size, and/or location of the different buttons or portions are provided in FIGS. 2A~2E, the visual illustrations are for the purpose of illustrations and are not intended to be limiting. For example, a different total number of elements/buttons/portions can be rendered via the client device 200 to enable the functions of uploading an audio file, selecting portion(s) of the audio file, downloading the overall summary (or summary 1, summary 2, etc.) and/or associated audio data, and playing audio data generated for the overall summary (or summary 1, summary 2, etc.), as shown in FIGS. 2A~2E. It is further noted that, while the user interfaces (e.g., 201, 203) are illustrated with respect to generate summaries for an audio file (e.g., audiobook), techniques described herein is applicable to other types of long-form content, such as streaming audio/speech data that lasts a long duration, a thesis or report having a length (e.g., hundreds of pages) exceeding the maximum token length of the generative model 190, and the same or similar descriptions are omitted herein for the sake of brevity.

Turning now to FIG. 3, a flowchart is depicted that illustrates an example method 300 of generating a summary using a generative model (e.g., a large language model, "LLM"), in accordance with various aspects of the present disclosure. For convenience, the operations of the method 300 are described with reference to a system that performs the operations. This system of the method 300 includes one or more processors, memory, and/or other component(s) of computing device(s) (e.g., client computing device 10 of FIG. 1, one or more servers, and/or other computing devices). Moreover, while operations of the method 300 are shown in a particular order, this is not meant to be limiting. One or more operations may be reordered, omitted, and/or added.

In various implementations, at block 301, the system, e.g., by way of key frame determination engine 112, obtains a transcript. In some implementations, the transcript can be acquired by performing speech recognition of audio content such as an audio-based file (e.g., an audiobook, a recording, etc.) or streaming audio data. In some implementations, the transcript can be acquired from metadata associated with content such as a video. In some implementations, the transcript can have a token length greater than a maximum token length for the LLM. The maximum token length can depend on the LLM itself and/or depend on hardware component(s) that performs processing using the LLM (e.g., constraints of memory and/or GPU(s)). In some implementations, instead of the transcript, the system can obtain other long-form content (e.g., natural language content or a transcript of audio content that has a token length greater than the maximum token length for the LLM), such as a thesis with over hundreds of pages.

In various implementations, at block 303, the system segments the transcript into a plurality of transcript portions $(T_1 \sim T_N)$. The plurality of transcripts can include, for instance, at least a first transcript portion $(T_1)$ and a second transcript portion $(T_2)$. In some implementations, the system can segment the transcript based on constraints of the LLM and/or the hardware component(s), such as the maximum token length (block 3031). For instance, the first transcript portion $(T_1)$ segmented from the transcript can have a first predefined token length, and the second transcript portion $(T_2)$ (and/or other transcript portion (e.g., $T_i$, $2<i \leq N$)) can have a second predefined token length. In some implementations, the first predefined token length can be the same as the second predefined token length, and both the first and second predefined token lengths are less than or equal to the maximum token length. In some implementations, the second predefined token length can be less than the first predefined token length, and the first second predefined token length is less than or equal to the maximum token length.

In some implementations, the system can segment the transcript into the plurality of transcript portions in response to determining that a token length of the transcript exceeds the maximum token length for the large language model. In these implementations, the system can segment the transcript into the plurality of transcript portions based on the maximum token length for the large language model.

In some implementations, the system segments the audio-based file into the plurality of transcript portions based on a timestamp for each of the plurality of transcript portions.

In some implementations, the audio-based file is an audio book that includes a plurality of chapters. In these implementations, the system segments the transcript into the plurality of transcript portions by: identifying chapters of the audio-based file, and segmenting the transcript into the plurality of transcript portions based on the identified chapters, each of the plurality of transcript portions corresponding to a respective chapter of the audio-based file.

In various implementations, for each of the plurality of transcript portions, the system, at block 305, generates a corresponding summary for the transcript portion, based on processing the transcript portion using a large language model. In some implementations, the system generates the corresponding summaries of the transcript portions by: generating a first summary, of the corresponding summaries, summarizing the first transcript portion $T_1$. The first summary can be generated based on processing the first transcript portion $T_1$ as input, using the LLM (block 3051). In some implementations, the system generates the corresponding summaries of the transcript portions by further: generating an $i^{th}$ summary, of the corresponding summaries, that summarizes the $i^{th}$ transcript portion ($1<i\leq N$). The system can generate the $i^{th}$ summary by processing the $i^{th}$ transcript portion and $(i-1)^{th}$ summary as input, using the LLM (305i). This process can be repeated until i equals N.

In some implementations, the system generates the first summary by: generating a first text prompt that includes the first transcript portion, includes a first natural language instruction to generate a summary for the first transcript portion, and that excludes any other of the transcript portions, and causing the first text prompt to be processed (as input) using the large language model to generate the first summary for the first transcript portion.

In some implementations, the system generates the second summary by: generating a second text prompt that includes the generated first summary, includes the second transcript portion, includes a second natural language instruction to generate a summary for the second transcript portion, and that excludes any other of the transcript portions, and causing the second text prompt to be processed using the large language model to generate the second summary for the second transcript portion.

In various implementations, at block 307, optionally, the system optionally generates an overall summary for the transcript based on the generated corresponding summaries.

In various implementations, at block 309, optionally, the system causes rendering of the overall summary for the transcript in response to a request for a condensed version of the audio-based file.

In some implementations, the system causes rendering of the overall summary for the transcript by: causing processing of the overall summary utilizing a speech synthesis model to generate corresponding audio data for the overall summary, and causing audible rendering of the corresponding audio data for the overall summary.

In some implementations, the transcript is from an audio-based file, and the system causes rendering of the overall summary further by: causing processing of the audio-based file to extract one or more audio feature embeddings (e.g., speaker embeddings each in the format of an N-dimensional numeric vector). In some implementations, the system causes processing of the overall summary utilizing the speech synthesis model to generate the corresponding audio data for the overall summary by: causing processing of the overall summary and the one or more audio feature embeddings, utilizing the speech synthesis model, to generate the corresponding audio data for the overall summary in one or more voices derived from the audio-based file.

In some implementations, the system optionally stores the corresponding audio data for the overall summary in association with the transcript (and/or the audio-based file), prior to receiving the request. In some implementations, the system causes audible rendering of the corresponding audio data for the overall summary by: causing audible rendering of audio data for the first summary in a first voice, and causing audible rendering of audio data for the second summary in a second voice.

In some implementations, the transcript for a respective portion from the plurality of portions includes one or more speaker tags each for a corresponding speaker in the respective portion. In these implementations, the summary for the respective portion includes at least one speaker tag, and wherein audio data for the summary for the respective portion is generated based on the at least one speaker tag. It is noted that while the method 300 is described with respect to generate summaries of different transcript portions of a transcript and/or to generate an overall summary for the transcript, the method 300 is applicable to generate summaries or an overall summary for other types of long-form content (such as a thesis, a survey, a report, a video, a series of podcasts, etc.)

For instance, in various implementations, a method implemented using one or more processors is provided, where the method includes: obtaining long-form content in natural language; and segmenting the long-form content into a plurality of content portions including at least a first content portion and a second content portion. The method can further include: for each of the plurality of content portions, generating a corresponding summary for the content portion that is based on processing the content portion using a large language model.

In some of the various implementations, the method further includes: determining whether a token length of the long-form content exceeds a maximum token length of the large language model. In these implementations, segmenting the long-form content into the plurality of content portions is performed in response to determining that token length of the long-form content exceeds the maximum token length of the large language model.

In some of the various implementations, generating the corresponding summaries of the content portions includes: generating a first summary, of the corresponding summaries, summarizing the first content portion, and generating a second summary, of the corresponding summaries, summarizing the second content portion.

In some of the various implementations, generating the first summary includes: generating a first text prompt that includes the first content portion, includes a first natural language instruction to generate a summary for the first content portion, and that excludes any other of the content portions; and causing the first text prompt to be processed using the large language model to generate the first summary for the first content portion.

In some of the various implementations, generating the second summary includes: generating a second text prompt that includes the generated first summary, includes the second content portion, includes a second natural language instruction to generate a summary for the second content portion, and that excludes any other of the content portions;

and causing the second text prompt to be processed using the large language model to generate the second summary for the second content portion.

In some of the various implementations, the first content portion segmented from the long-form content can have a first predefined token length, and the second content portion segmented from the long-form content can have a second predefined token length, where the second predefined token length is less than or equal to the first predefined token length. In some other implementations, the first and second predefined token lengths are less than or equal to the maximum token length.

In some of the various implementations, the method further includes: generating an overall summary for the long-form content based on the generated corresponding summaries; and in response to a request for a condensed version of the long-form content, causing rendering of the overall summary for the long-form content.

Turning now to FIG. 4, a flowchart is depicted that illustrates another example method of generating a summary using a generative model (e.g., a large language model, "LLM"), in accordance with various aspects of the present disclosure. This system of the method 400 includes one or more processors, memory, and/or other component(s) of computing device(s) (e.g., client computing device 10 of FIG. 1, one or more servers, and/or other computing devices). Moreover, while operations of the method 400 are shown in a particular order, this is not meant to be limiting. One or more operations may be reordered, omitted, and/or added.

At block 401, the system obtains a transcript of an audio-based file, the transcript including one or more speaker tags each for a corresponding speaker associated with the audio-based file. The audio-based file, for instance, can be an audiobook, or a video, etc.

At block 403, the system segments the transcript into a plurality of transcript portions including at least a first transcript portion and a second transcript portion.

At block 405, the system, for each of the plurality of transcript portions, generates a corresponding summary for the transcript portion that is based on processing the transcript portion using a large language model. The corresponding summary, for instance, can each be associated with at least one speaker tag from the one or more speaker tags. The system can generate the corresponding summaries of the transcript portions by: generating a first summary, of the corresponding summaries, summarizing the first transcript portion, by generating a first text prompt that includes the first transcript portion, includes a first natural language instruction to generate a summary for the first transcript portion, and that excludes any other of the transcript portions. The system can cause the first text prompt to be processed using the large language model to generate the first summary for the first transcript portion. The system can generate a second summary, of the corresponding summaries, summarizing the second transcript portion, by generating a second text prompt that includes the generated first summary, includes the second transcript portion, includes a second natural language instruction to generate a summary for the second transcript portion, and that excludes any other of the transcript portions. The system can cause the second text prompt to be processed using the large language model to generate the second summary for the second transcript portion.

At block 407, the system generates an overall summary for the audio-based file based on the generated corresponding summaries.

At block 409, the system causes rendering of the overall summary for the audio-based file in one or more voices based on the one or more speaker tags, in response to a request for a condensed version of the audio-based file.

Figure 5:
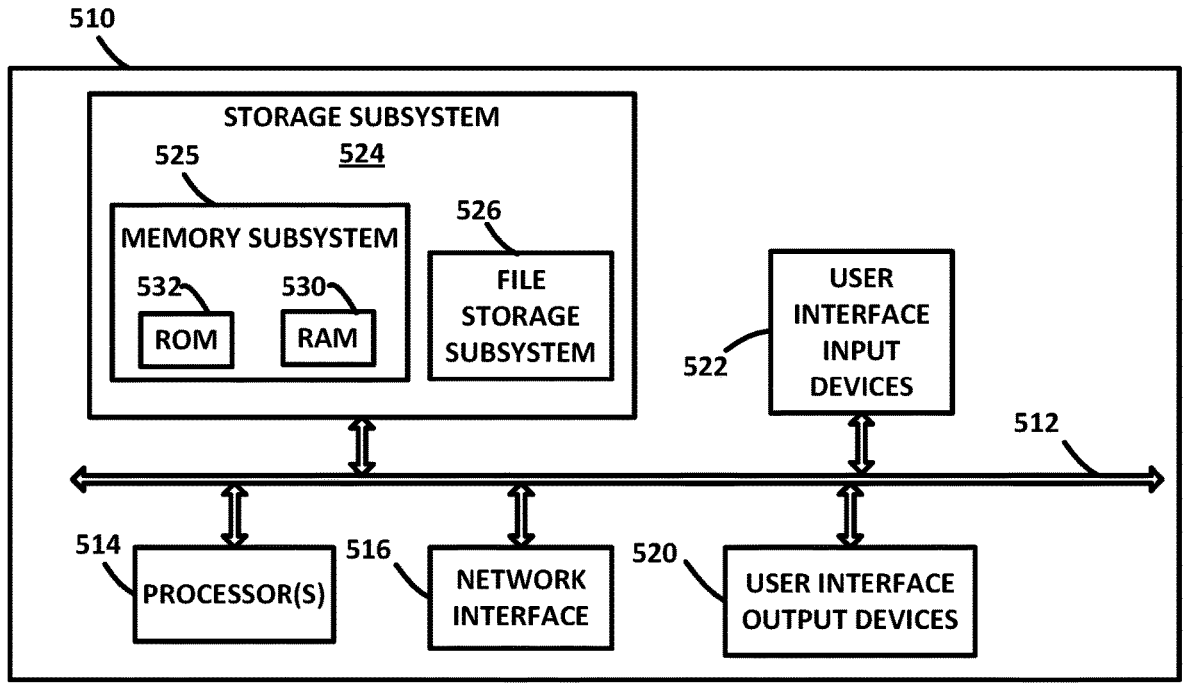
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based LLM-based assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Some other implementations disclosed herein recognize that training a generative model can require a significant quantity (e.g., millions) of training instances. Due to the significant quantity of training instances needed, many training instances will lack input and/or output properties that are desired when the generative model is deployed for utilization. For example, some training instance outputs for an LLM can be undesirably grammatically incorrect, undesirably too concise, undesirably too robust, etc. Also, for example, some training instance inputs for an LLM can lack desired contextual data such as user attribute(s) associated with the input, conversational history associated with the input, etc. As a result of many of the LLM training instances lacking desired input and/or output properties, the LLM will, after training and when deployed, generate many instances of output that likewise lack the desired output properties.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

What is claimed is:

1. A method implemented using one or more processors, the method comprising:

obtaining a transcript of an audio-based file;

segmenting the transcript into a plurality of transcript portions including at least a first transcript portion and a second transcript portion;

for each of the plurality of transcript portions, generating a corresponding summary for the transcript portion that is based on processing the transcript portion using a large language model, wherein generating the corresponding summaries of the transcript portions includes:

generating a first summary, of the corresponding summaries, summarizing the first transcript portion, wherein generating the first summary comprises:

generating a first text prompt that includes the first transcript portion, includes a first natural language instruction to generate a summary for the first transcript portion, and that excludes any other of the transcript portions, and causing the first text prompt to be processed using the large language model to generate the first summary for the first transcript portion, and generating a second summary, of the corresponding summaries, summarizing the second transcript portion, wherein generating the second summary comprises:

generating a second text prompt that includes the generated first summary that is summarizing the first transcript portion that was included in the first text prompt, includes the second transcript portion, includes a second natural language instruction to generate a summary for the second transcript portion, and that excludes any other of the transcript portions, and causing the second text prompt to be processed using the large language model to generate the second summary for the second transcript portion;

generating an overall summary for the audio-based file based on the generated corresponding summaries; and in response to a request for a condensed version of the audio-based file:

causing rendering of the overall summary for the audio-based file.

2. The method of claim 1, wherein causing rendering of the overall summary for the audio-based file comprises:

causing processing of the overall summary utilizing a speech synthesis model to generate corresponding audio data for the overall summary; and causing audible rendering of the corresponding audio data for the overall summary.

3. The method of claim 2, wherein causing rendering of the overall summary for the audio-based file further comprises: causing processing of the audio-based file to extract one or more audio feature embeddings, and causing processing of the overall summary utilizing the speech synthesis model to generate the corresponding audio data for the overall summary comprises:

causing processing of the overall summary and the one or more audio feature embeddings, utilizing the speech synthesis model, to generate the corresponding audio data for the overall summary in one or more voices derived from the audio-based file.

4. The method of claim 1, further comprising:

prior to receiving the request, storing the corresponding audio data for the overall summary in association with the audio-based file.

5. The method of claim 2, wherein causing audible rendering of the corresponding audio data for the overall summary comprises:

causing audible rendering of audio data for the first summary in a first voice, and causing audible rendering of audio data for the second summary in a second voice.

6. The method of claim 1, wherein segmenting the transcript into the plurality of transcript portions is in response to determining that a token length of the transcript exceeds a maximum token length for the large language model.

7. The method of claim 6, wherein segmenting the transcript into the plurality of transcript portions is based on the maximum token length for the large language model.

8. The method of claim 1, wherein the audio-based file is an audio book including a plurality of chapters, and wherein segmenting the transcript into the plurality of transcript portions comprises:

identifying chapters of the audio-based file, and segmenting the transcript into the plurality of transcript portions based on the identified chapters, each of the plurality of transcript portions corresponding to a respective chapter of the audio-based file.

9. The method of claim 1, wherein segmenting the transcript into the plurality of portions is based on a timestamp for each of the plurality of portions.

10. The method of claim 1, wherein the transcript for a respective portion from the plurality of portions includes one or more speaker tags each for a corresponding speaker in the respective portion.

11. The method of claim 10, wherein the summary for the respective portion includes at least one speaker tag, and wherein audio data for the summary for the respective portion is generated based on the at least one speaker tag.

12. A method implemented using one or more processors, the method comprising:

obtaining a transcript of an audio-based file, the transcript including one or more speaker tags each for a corresponding speaker associated with the audio-based file;

segmenting the transcript into a plurality of transcript portions including at least a first transcript portion and a second transcript portion;

for each of the plurality of transcript portions, generating a corresponding summary for the transcript portion that is based on processing the transcript portion using a large language model, wherein generating the corresponding summaries of the transcript portions includes:

generating a first summary, of the corresponding summaries, summarizing the first transcript portion, wherein generating the first summary comprises:

generating a first text prompt that includes the first transcript portion, includes a first natural language instruction to generate a summary for the first transcript portion, and that excludes any other of the transcript portions, and causing the first text prompt to be processed using the large language model to generate the first summary for the first transcript portion, and generating a second summary, of the corresponding summaries, summarizing the second transcript portion, wherein generating the second summary comprises:

generating a second text prompt that includes the generated first summary that is summarizing the first transcript portion that was included in the first text prompt, includes the second transcript portion, includes a second natural language instruction to generate a summary for the second transcript portion, and that excludes any other of the transcript portions, and causing the second text prompt to be processed using the large language model to generate the second summary for the second transcript portion;

generating an overall summary for the audio-based file based on the generated corresponding summaries; and in response to a request for a condensed version of the audio-based file:

causing rendering of the overall summary for the audio-based file in one or more voices based on the one or more speaker tags.

13. The method of claim 12, wherein segmenting the transcript into the plurality of transcript portions is in response to determining that a token length of the transcript exceeds a maximum token length for the large language model.

14. The method of claim 13, wherein segmenting the transcript into the plurality of transcript portions is based on the maximum token length for the large language model.

15. A method implemented using one or more processors, the method comprising:

obtaining long-form content in natural language;

segmenting the long-form content into a plurality of content portions including at least a first content portion and a second content portion;

for each of the plurality of content portions, generating a corresponding summary for the content portion that is based on processing the content portion using a large language model, wherein generating the corresponding summaries of the content portions includes:

generating a first summary, of the corresponding summaries, summarizing the first content portion, wherein generating the first summary comprises:

generating a first text prompt that includes the first content portion, includes a first natural language instruction to generate a summary for the first content portion, and that excludes any other of the content portions, and causing the first text prompt to be processed using the large language model to generate the first summary for the first content portion, and generating a second summary, of the corresponding summaries, summarizing the second content portion, wherein generating the second summary comprises:

generating a second text prompt that includes the generated first summary that is summarizing the first content portion that was included in the first text prompt, includes the second content portion, includes a second natural language instruction to generate a summary for the second content portion, and that excludes any other of the content portions, and causing the second text prompt to be processed using the large language model to generate the second summary for the second content portion;

generating an overall summary for the long-form content based on the generated corresponding summaries; and in response to a request for a condensed version of the long-form content:

causing rendering of the overall summary for the long-form content.

16. The method of claim 15, further comprising:

determining whether a token length of the long-form content exceeds a maximum token length of the large language model.

17. The method of claim 16, wherein segmenting the long-form content into the plurality of content portions is in response to determining that token length of the long-form content exceeds the maximum token length of the large language model.

18. The method of claim 17, wherein the first content portion segmented from the long-form content has a first predefined token length, and the second content portion segmented from the long-form content has a second predefined token length, wherein the second predefined token length is less than or equal to the first predefined token length.

19. The method of claim 18, wherein the first and second predefined token lengths are less than or equal to the maximum token length.

* * * * *